United States Patent
Tomaru et al.

(10) Patent No.: US 7,344,786 B2
(45) Date of Patent: Mar. 18, 2008

(54) MAGNETIC RECORDING MEDIUM INCLUDING A SMOOTH COATING LAYER ON ONE SIDE OF THE SUPPORT

(75) Inventors: Mikio Tomaru, Kanagawa (JP); Masatoshi Takahashi, Kanagawa (JP); Hiroshi Hashimoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 10/282,145

(22) Filed: Oct. 29, 2002

(65) Prior Publication Data

US 2003/0148128 A1 Aug. 7, 2003

(30) Foreign Application Priority Data

Oct. 29, 2001 (JP) ............ P.2001-330623
Oct. 29, 2001 (JP) ............ P.2001-330646

(51) Int. Cl.
*G11B 5/70* (2006.01)
(52) U.S. Cl. ............ 428/840.1; 428/847.7
(58) Field of Classification Search ......... 428/694 ST, 428/694 SL, 694 BS
See application file for complete search history.

(56) References Cited

U.S. PATENT DOCUMENTS

| | | | |
|---|---|---|---|
| 4,619,856 A | 10/1986 | Kamada et al. | |
| 4,664,964 A | 5/1987 | Okita et al. | |
| 4,664,965 A | 5/1987 | Okita et al. | |
| 4,976,989 A | 12/1990 | Aonuma et al. | |
| 5,281,472 A * | 1/1994 | Takahashi et al. | 428/336 |
| 5,306,523 A | 4/1994 | Shibata | |
| 5,336,561 A * | 8/1994 | Hashimoto et al. | 428/336 |
| 5,496,618 A | 3/1996 | Kurihara et al. | |
| 5,506,064 A * | 4/1996 | Tamai et al. | 428/842.4 |
| 5,908,683 A * | 6/1999 | Suzuki et al. | 428/840.2 |
| 5,912,063 A * | 6/1999 | Osawa et al. | 428/847.1 |
| 6,017,605 A * | 1/2000 | Yamazaki et al. | 428/842 |
| 6,316,077 B1 | 11/2001 | Doushita et al. | |
| 6,358,619 B1 * | 3/2002 | Sueoka et al. | 428/474.4 |
| 6,379,774 B1 * | 4/2002 | Tojo et al. | 428/141 |
| 6,461,726 B1 * | 10/2002 | Handa et al. | 428/327 |
| 6,468,627 B2 * | 10/2002 | Ono et al. | 428/141 |
| 6,475,598 B1 | 11/2002 | Naoe et al. | |
| 6,485,810 B1 * | 11/2002 | Uchida et al. | 428/141 |
| 6,670,030 B1 * | 12/2003 | Uchida et al. | 428/323 |
| 2003/0207484 A1 * | 11/2003 | Nishikawa | 438/31 |

FOREIGN PATENT DOCUMENTS

| | | |
|---|---|---|
| DE | 42 12 656 A1 | 10/1992 |
| EP | 0 916 484 A1 | 5/1999 |
| JP | 63-173224 A | 7/1988 |
| JP | 2-265011 A | 10/1990 |
| JP | 5-57647 B | 8/1993 |
| JP | 6-52541 | 2/1994 |
| JP | 6-309650 | 11/1994 |
| JP | 10-302243 A | 11/1998 |
| JP | 2001-67640 A | 3/2001 |

OTHER PUBLICATIONS

European Search Report dated Apr. 16, 2003.
European Office Action dated Feb. 11, 2005.

* cited by examiner

*Primary Examiner*—Kevin M. Bernatz
(74) *Attorney, Agent, or Firm*—Sughrue Mion, PLLC

(57) ABSTRACT

A magnetic recording medium comprising a support having provided thereon a magnetic layer, wherein a smooth coating layer having a thickness of from 0.10 to 1 µm, surface roughness of 5 nm or less, and 20 or less per 900 µm² of the protrusions having a height of 20 nm or more measured by an interatomic force microscope (AFM) is provided on the surface of at least one side of the support. And a method for producing a magnetic recording medium comprising a support having provided thereon a magnetic layer, which comprises providing a smooth coating layer having a thickness of from 0.10 to 1 µm, surface roughness of 5 nm or less, and 20 or less per 900 µm² of the protrusions having a height of 20 nm or more measured by an interatomic force microscope (AFM) on the surface of at least one side of the support, and forming at least the magnetic layer on the smooth coating layer without performing rolling-up operation.

7 Claims, No Drawings

MAGNETIC RECORDING MEDIUM INCLUDING A SMOOTH COATING LAYER ON ONE SIDE OF THE SUPPORT

FIELD OF THE INVENTION

The present invention relates to a magnetic recording medium and the manufacturing method of the same, in particular to a support for a magnetic recording medium.

BACKGROUND OF THE INVENTION

In the field of the magnetic disc, a 2 MB MF-2HD flexible disc using Co-modified iron oxide has been generally loaded in a personal computer. However, along with the increase in the amount of data to be dealt with, the capacity thereof has become insufficient and the increase of the capacity of the flexible disc has been demanded.

In the field of the magnetic tape also, along with the prevalence of the office computer, such as minicomputers, personal computers and work stations, magnetic tapes for recording computer data as external storage media (a so-called backup tape) have been eagerly studied. For putting magnetic tapes for such usage to practical use, the enhancement of recording capacity has been strongly demanded conjointly with the miniaturization of a computer and the increase of information processing performance (i.e., the increase of throughput) for achieving high capacity recording and the miniaturization.

Magnetic recording media comprising a nonmagnetic support having coated thereon a magnetic layer comprising an iron oxide, a Co-modified iron oxide, $CrO_2$, a ferromagnetic metal powder (MP), or a hexagonal ferrite powder dispersed in a binder have been conventionally widely used. Of these powders, ferromagnetic metal fine powders and hexagonal ferrite fine powders are known to be excellent in high density recording characteristics. In the case of a disc, as high capacity discs using ferromagnetic metal fine powders which are excellent in high density recording characteristics, there are 10 MB MF-2TD and 21 MB MF-2SD, and as high capacity discs using hexagonal ferrite, there are 4 MB MF-2ED and 21 MB Floptical, however, any of these are not satisfactory with respect to capacities and performances. As is the circumstance, various attempts have been made to improve high density recording characteristics. For example, high capacity and high density recording of from 100 M to 200 M, e.g., LS-120 and ZIP, has been realized, and now even higher density recording of a real recording density of 0.2 G bit/inch$^2$ or more has been demanded. In addition, due to the requirement for shortening access time, the rotation frequency of discs has a tendency to increase.

In such a high density, high rotational and high transfer magnetic recording medium, higher running property and higher durability than running property and durability of conventional media are required for maintaining stable recording and reproduction. Prior art techniques which are proposed for mainly improving recording density and running durability in coating type magnetic recording media are described below.

For example, Japanese Patent (Application) Laid-Open No. 52541/1994 discloses a magnetic tape having an average protrusion height of abrasives on the magnetic layer surface of 15 nm or less, and electromagnetic characteristics thereof are compatible with durability by improving head abrasion and head contamination. Japanese Patent Laid-Open No. 12651/1994 discloses a magnetic disc in which the magnetic layer has Ra of 15 nm or less, protrusions having a height of 30 nm or more are distributed from 125,000 to 250,000 per mm$^2$ of the magnetic layer, and the amount of a lubricant in the magnetic layer is prescribed.

Japanese Patent Laid-Open No. 309650/1994 discloses a magnetic recording medium, in particular a magnetic disc, in which a magnetic layer contains from 8 to 30 mass parts (i.e., weight parts) of a lubricant based on 100 mass parts (i.e., weight parts) of the magnetic powder, and the number of protrusions having the height higher than the surface which is 20 nm lower than the highest protrusion is specified to be from 400 to 2,500 per mm$^2$, that is, the amount of the lubricant in the magnetic layer and the existing density of protrusions having specific height on the magnetic layer surface are specified to thereby secure the running stability.

Magnetic heads making electromagnetic induction as a principle of operation (an induction type magnetic head) have been conventionally used and prevailed. However, magnetic heads have reached the limits of their abilities to be used for further higher density recording and reproduction. That is, it is necessary to increase the number of turns of a reproduction head coil to obtain higher reproduction output, but when the turn number of a reproduction head coil is increased, the inductance increases and the resistance at a high frequency region increases, as a result, the reproduction output decreases.

A reproducing head making MR (magneto resistance) as a principle of operation has been proposed in recent years and is coming to be used in a hard disc, and Japanese Patent Laid-Open No. 227517/1996 proposes the application of the head to a magnetic tape. The MR head can provide reproduction output of several times as large as that by the induction type magnetic head, and since no induction coil is used, equipment noise such as impedance noise is widely reduced, therefore, it has been possible to obtain a large S/N ratio by reducing the noise of a magnetic recording medium. In other words, good recording and reproduction can be done and high density recording characteristics can be drastically improved by lessening the noise of magnetic recording media hiding behind the instruments.

However, there is a problem with the MR head such that noise is generated by the influence of a small amount of heat (thermal noise), in particular, if the MR head is touched to the protrusions on the surface of a magnetic layer, noise is suddenly and continuously increased, and in the case of digital recording, the problem is sometimes worsened in such a degree as error correction is impossible. This problem of thermal noise is serious in a magnetic recording medium for use in a system of reproducing recorded signals of 0.5 G bit/inch$^2$ or more of recording density.

It is important to control the surface property of a magnetic layer for reducing thermal noise, and controlling the surface property of a support has been done as a means for that purpose. For example, Japanese Patent Nos. 2938548 and 2938549 suggest supports provided with a polyurethane covering layer, and Japanese Patent Publication No. 57647/1993 suggests a support provided with a layer comprising a compound polymerizable by radiation irradiation.

However, the support produced by the former technique is expensive and insufficient in smoothness, and the latter technique requires an expensive irradiation apparatus and in some cases the support is damaged at covering.

Further, a smoothed support is supposed to be once rolled up in a roll according to both techniques and the wound roll is delivered again in a coating or deposition process separately provided for providing a functional layer such as a magnetic layer. However, a smoothed support is hard to deal with and is easily wrinkled at rolling-up operation, therefore, productivity and yield are remarkably low.

SUMMARY OF THE INVENTION

An object of the present invention is to provide a magnetic recording medium which shows good electromagnetic characteristics even when used in a recording and reproducing system integrated with an MR head, a C/N ratio or S/N ratio in a high density recording region is drastically improved, and is excellent in productivity and inexpensive. Another object of the present invention is to provide a producing method of the same.

The present invention provide a magnetic recording medium comprising a support having provided thereon a magnetic layer, wherein a smooth coating layer having a thickness of from 0.10 to 1 µm, surface roughness of 5 nm or less, and 20 or less per 900 µm² of the protrusions having a height of 20 nm or more measured by an interatomic force microscope (AFM) is provided on the surface of at least one side of the support.

The preferred embodiments of the present invention are as follows.

(1) The magnetic recording medium, wherein the elution (amount) of the smooth coating layer in a mixed solution of methyl ethyl ketone (MEK)/cyclohexanone (1/1) is from 0.0 to 0.4 mg/cm².

(2) The magnetic recording medium, wherein the smooth coating layer comprises a high polymer having a number average molecular weight of from 10,000 to 100,000.

(3) The magnetic recording medium, wherein a coating solution for forming the smooth coating layer has a viscosity of 50 cp or less and surface tension of 22 mN/m or higher.

(4) The magnetic recording medium, wherein the smooth coating layer is formed by coating a coating solution containing a compound having a radiation-curable functional group in the molecule, and irradiating the functional group with radiation.

(5) The magnetic recording medium, wherein the magnetic layer comprises a ferromagnetic powder and a binder as main components and has a thickness of from 20 to 500 nm.

(6) The magnetic recording medium, wherein a nonmagnetic layer containing a nonmagnetic powder and a binder and having a thickness of from 0.5 to 3.0 µm is provided between the magnetic layer and the smooth coating layer.

(7) The magnetic recording medium, wherein the nonmagnetic layer and the magnetic layer are provided by wet-on-wet coating.

The present invention further provide a method for producing a magnetic recording medium comprising a support having provided thereon a magnetic layer, which comprises providing a smooth coating layer having a thickness of from 0.10 to 1 µm, surface roughness of 5 nm or less, and 20 or less per 900 µm² of the protrusions having a height of 20 nm or more measured by an interatomic force microscope (AFM) on the surface of at least one side of the support, and forming at least the magnetic layer on the smooth coating layer without performing rolling-up operation.

The preferred embodiments of the present invention are as follows.

(1) The producing method of the magnetic recording medium, wherein the smooth coating layer is formed by coating and drying a high polymer solution.

(2) The producing method of the magnetic recording medium, wherein the smooth coating layer is formed by coating a coating solution containing a compound having a radiation-curable functional group in the molecule, and irradiating the coated layer with radiation.

(3) The producing method of the magnetic recording medium, wherein the smooth coating layer is formed by coating a coating solution containing a compound having an ultraviolet-curable functional group in the molecule, and irradiating the coated layer with ultraviolet rays.

(4) The producing method of the magnetic recording medium, wherein the magnetic layer has a thickness of from 20 to 500 nm.

(5) The producing method of the magnetic recording medium, wherein a nonmagnetic layer containing a nonmagnetic powder and a binder and having a thickness of from 0.5 to 3.0 µm is provided between the magnetic layer and the smooth coating layer.

(6) The producing method of the magnetic recording medium, wherein the nonmagnetic layer and the magnetic layer are provided by wet-on-wet coating.

DETAILED DESCRIPTION OF THE INVENTION

The present invention provide a magnetic recording medium comprising a support having provided thereon a magnetic layer, wherein a smooth coating layer having a thickness of from 0.10 to 1 µm, surface roughness of 5 nm or less, and 20 or less per 900 µm² of the protrusions having a height of 20 nm or more measured by an interatomic force microscope (AFM) is provided on the surface of at least one side of the support.

The present invention further provide a method for producing a magnetic recording medium comprising a support having provided thereon a magnetic layer, which comprises providing a smooth coating layer having a thickness of from 0.10 to 1 µm, surface roughness of 5 nm or less, and 20 or less per 900 µm² of the protrusions having a height of 20 nm or more measured by an interatomic force microscope (AFM) on the surface of at least one side of the support, and forming at least the magnetic layer on the smooth coating layer without performing rolling-up operation.

A support on which a smooth coating layer is provided generally takes the form of a roll, and the smooth coating layer is provided on the support with pulling out the support, a magnetic layer is provided on the smooth coating layer after drying without being rolled-up, and then the support is cut in a prescribed figure or size. Accordingly, something unfavorable, e.g., wrinkles, can be avoided even when the smooth coating layer is highly smoothed as above, so that a magnetic layer having an excellent surface property can be formed and C/N or S/N can be improved.

A smooth coating layer may be provided on both sides or one side of a support. For example, in the case of a disc-like magnetic recording medium, a smooth coating layer is generally provided on both sides of a support, and in the case of a tape-like magnetic recording medium, a smooth coating layer is provided on one side, but these are not limitative. The thickness of a smooth coating layer is more preferably from 0.20 to 0.70 µm.

When the thickness of a smooth coating layer is out of the above range, it sometimes happens that the surface roughness and PN (a height of 20 nm or more) of the smooth coating layer are difficult to fall in the ranges of the present invention. On the other hand, the thickness exceeding 1 µm is disadvantageous for improving the capacity of a tape-like magnetic recording medium.

The surface roughness of a smooth coating layer is represented by a central plane average surface roughness (Ra) (defined in JIS B 0601) of the area of 250 μm×250 μm measured by TOPO-3D (a product of WYKO, Ariz., U.S.A.). Ra is more preferably from 0.5 to 4.0 nm, and particularly preferably from 1.0 to 3.0 nm.

The height of protrusion on a smooth coating layer is defined as the height with the central plane obtained by an interatomic force microscope (such a plane as the volume enclosed with the plane and the roughness curve is equal and smallest on the upper and lower sides of the plane) as the reference plane.

Accordingly, PN (20 nm or more) is the total number of protrusions per 30 μm square whose height higher than the reference plane is 20 nm or higher, which is protrusion density. PN (20 nm or more) is more preferably 10/900 μm² or less.

The Ra and PN (20 nm or more) of a smooth coating layer is preferably as small as possible, and C/N or S/N cannot be improved if at least one of them is higher than the above range.

Means of forming such a smooth coating layer are not especially restricted, but the following means are preferred.
1) A means of forming a smooth coating layer by coating a high polymer solution on a support and drying.
2) A means of forming a smooth coating layer by coating a coating solution containing a compound having a radiation-curable functional group in the molecule, and irradiating the coated layer with radiation.

Means 1) is described below.

The high polymer solution for forming a smooth coating layer has a viscosity of preferably 50 cp or lower, more preferably 30 cp or lower, and surface tension of preferably 22 mN/m or higher, and more preferably 24 mN/m or lower.

The high polymer preferably has a number average molecular weight of from 10,000 to 100,000. When a magnetic recording medium is formed by coating a coating layer on a smooth coating layer, high polymers insoluble or hardly soluble in the solvents for the smooth coating layer are preferably used, and water-soluble high polymers are particularly preferred.

The high polymer has a glass transition temperature (Tg) of preferably from 0 to 120° C., more preferably from 10 to 80° C. When the glass transition temperature is less than 0° C., sometimes blocking occurs at the end face, and when it exceeds 120° C., there are cases where the internal stress in a smooth coating layer is not relaxed, as a result, adhesive strength cannot be secured.

High polymers which are used for forming a smooth coating layer are not especially limited, but those which satisfy the above conditions are preferred, e.g., polyamide, polyamideimide, polyester, polyurethane and acrylate resins are exemplified.

As the polyamide, polycondensation compounds of diamine and dicarboxylic acid, ring opening polymerization compounds of lactams, and copolymers of the salts of diamine and dicarboxylic acid (1/1 by molar ratio) and lactams, e.g., caprolactam are exemplified.

The examples of the diamines which can be used include hydrazine, methylenediamine, ethylenediamine, trimethylenediamine, tetramethylenediamine, pentamethylenediamine, hexamethylenediamine, heptamethylenediamine, octamethylenediamine, nonamethylenediamine, decamethylenediamine, diaminocyclohexane, di(aminomethyl)cyclohexane, bis(4-aminocyclohexyl)methane, bis(4-amino-3,5-methylcyclohexyl)methane, o-phenylenediamine, m-phenylenediamine, p-phenylenediamine, 4,4'-diaminobiphenyl, tolylenediamine, xylenediamine, naphthylenediamine, bis(aminomethyl)piperazine, bis(aminoethyl)piperazine, bis(aminopropyl)piperazine, 1-(2-aminomethyl)piperazine, 1-(2-aminoethyl)piperazine, and 1-(2-aminopropyl)piperazine.

As the dicarboxylic acid, oxalic acid, malonic acid, succinic acid, glutaric acid, adipic acid, pimelic acid, azelaic acid, sebacic acid, cyclohexanedicarboxylic acid, orthophthalic acid, isophthalic acid, terephthalic acid, and naphthalenedicarboxylic acid, and acid anhydrides of these acids can be used.

As the lactam, α-pyrrolidone, α-piperidone, γ-butyrolactam, δ-valerolactam, ε-caprolactam, ω-capryllactam and ω-laurolactam can be used.

As the polyamide, amino acid polymers are further exemplified. The amino acid polymers may be synthetic polymers, or may be natural high polymers, e.g., proteins such as collagen.

Further, the polyamides described in compiled by Osamu Fukumoto, *Polyamide Jushi* (*Polyamide Resins*), A Course of Plastic Materials (16), published by Nikkan Kogyo Shinbun-Sha; compiled by Murahashi, Imoto and Tani, *Gosei Kobunshi V* (*Synthetic High Polymers V*), Asakura Shoten; U.S. Pat. Nos. 2,130,497, 2,130,523, 2,149,273, 2,158,064, 2,223,403, 2,249,627, 2,534,347, 2,540,352, 2,715,620, 2,756,221, 2,939,862, 2,994,693, 3,012,994, 3,133,956, 3,188,228, 3,193,475, 3,193,483, 3,197,443, 3,226,362, 3,242,134, 3,247,167, 3,299,009, 3,328,352, and 3,354,123; and the polyamides having a tertiary amino group disclosed in Japanese Patent Laid-Open No. 283241/1999 are also arbitrarily used.

The polyamideimides can be obtained by the reaction of low molecular weight polyamide having amino groups at terminals with acid dianhydride and the esters thereof, the reaction of low molecular weight polyamide acid having amino groups at terminals with dibasic acid chloride, and the reaction of trimellitic acid derivative with diamine.

As the polyamide components, diamines as described in the above polyamide, and those formed from dicarboxylic acid or amino acid are exemplified. As the diamines for use in the reaction with trimellitic acid derivative, the above diamines are exemplified.

As the acid dianhydride and the esters thereof, pyromellitic acid-1,4-dimethyl ester, pyromellitic acid tetramethyl ester, pyromellitic acid ethyl ester, 2,3,6,7-naphthalenetetracarboxylic acid dianhydride, 3,3',4,4'-biphenyltetracarboxylic acid dianhydride, 1,2,5,6-naphthalenetetracarboxylic acid dianhydride, 2,2',3,3'-biphenyltetracarboxylic acid dianhydride, and 2,2',6,6'-biphenyltetracarboxylic acid dianhydride are exemplified.

The low molecular weight polyamide acid having amino groups at terminals can be formed by the reaction of the above diamine with acid dianhydride and ester thereof.

As the dibasic acid chloride, chloride of the above dicarboxylic acid can be exemplified.

The polyamideimide can be arbitrarily selected from those described in *Polyamide Resin Handbook*, published by Nikkan Kogyo Shinbun-Sha.

As the polyester, polyesters synthesized from dicarboxylic acid and glycol are exemplified.

As the dicarboxylic acid, aromatic, aliphatic and alicyclic dicarboxylic acids, specifically the same as those described above, are exemplified, and aromatic dicarboxylic acids are preferably used.

As the glycol component, aliphatic, alicyclic and aromatic glycols, e.g., ethylene glycol, diethylene glycol, triethylene glycol, tetraethylene glycol, propylene glycol, butanediol, neopentyl glycol, hexanediol, cyclohexanediol, cyclohexanedimethanol and bisphenol A are exemplified.

As the polyurethane, polyurethanes manufactured from polyol, diisocyanate and a chain extender by well-known methods are exemplified.

As the polyol, polyester polyol, polyether polyol and polycarbonate polyol are used. As the polyester components of the polyester polyol, diols of the above polyesters are exemplified. As the diisocyanate, those described in the item of the binder for use in a magnetic layer are exemplified. As the chain extender, polyhydric alcohols and polyamines (e.g., the above diamines) are used.

As the high polymers which are used for forming the above smooth coating layer, it is preferred to use high polymers to which at least one polar group selected from —COOM, —$SO_3M$, —$OSO_3M$, —P=$O(OM)_2$, —O—P=$O(OM)_2$ (wherein M represents a hydrogen atom, an alkali metal or ammonium), OH, $NR_2$, $N^+R_3$ (wherein R represents a hydrocarbon group), an epoxy group, SH, and CN is introduced by copolymerization or addition reaction, if necessary. The addition amount of the polar group is preferably from 0.1 to 3 meg/g.

As the solvents for the coating solution for forming a smooth coating layer, ketones, e.g., acetone, methyl ethyl ketone, methyl isobutyl ketone, diisobutyl ketone, cyclohexanone, isophorone, and tetrahydrofuran, alcohols, e.g., methanol, ethanol, propanol, butanol, isobutyl alcohol, isopropyl alcohol and methylcyclohexanol, esters, e.g., methyl acetate, butyl acetate, isobutyl acetate, isopropyl acetate, ethyl lactate and glycol acetate, glycol ethers, e.g., glycol dimethyl ether, glycol monoethyl ether and dioxane, aromatic hydrocarbons, e.g., benzene, toluene, xylene, cresol and chlorobenzene, chlorinated hydrocarbons, e.g., methylene chloride, ethylene chloride, carbon tetrachloride, chloroform, ethylene chlorohydrin and dichlorobenzene, N,N-dimethylformamide, hexane and water can be used. These solvents need not be 100% pure and, in addition to the main component, they may contain impurities such as isomers, non-reacted materials, byproducts, decomposed products, oxides and water. However, the content of such impurities is preferably 30% or less, more preferably 10% or less. Of these solvents, alcohols, e.g., methanol, ethanol and isopropyl alcohol, and water, cyclohexanone, methyl ethyl ketone and butyl acetate are preferably used alone or in combination.

Means 2), that is, a means of forming a smooth coating layer with a coating solution containing a compound having a radiation-curable functional group in the molecule is described below.

"A compound having a radiation-curable functional group in the molecule" (herein after referred to as "a radiation-curable compound") means a compound having a property of becoming a high molecular weight compound and curing by polymerization or crosslinking when energy by radiation, e.g., electron beam or ultraviolet ray, is applied. The radiation-curable compound is not subject to reaction so long as such energy is not applied. Therefore, a coating solution containing a radiation-curable compound is stable in viscosity so long as not irradiated with radiation, and so a high film smoothness can be obtained. Further, since a reaction proceeds in a moment by high energy of radiation, a high film strength can be obtained.

The molecular weight of the radiation-curable compound is preferably from 200 to 2,000. A molecular weight in this range is comparatively low, therefore, a coating layer can easily flow and moldability is high, so that a smooth film can be obtained.

As the bifunctional or higher radiation-curable compounds, acrylic esters, acrylamides, methacrylic esters, methacrylic acid amides, allyl compounds, vinyl ethers and vinyl esters are exemplified.

The specific examples of the bifunctional radiation-curable compounds include those obtained by adding acrylic acid or methacrylic acid to aliphatic diol, e.g., ethylene glycol diacrylate, propylene glycol diacrylate, butanediol diacrylate, hexanediol diacrylate, diethylene glycol diacrylate, triethylene glycol diacrylate, tetraethylene glycol diacrylate, neopentyl glycol diacrylate, tripropylene glycol diacrylate, ethylene glycol dimethacrylate, propylene glycol dimethacrylate, butanediol dimethacrylate, hexanediol dimethacrylate, diethylene glycol dimethacrylate, triethylene glycol dimethacrylate, tetraethylene glycol dimethacrylate, neopentyl glycol dimethacrylate and tripropylene glycol dimethacrylate.

Further, polyether acrylate and polyether methacrylate obtained by adding acrylic acid or methacrylic acid to polyether polyol, such as polyethylene glycol, polypropylene glycol and polytetramethylene glycol, well-known dibasic acids, and polyester acrylate and polyester methacrylate obtained by adding acrylic acid or methacrylic acid to polyester polyol obtained from glycol can also be used.

Polyurethane acrylate and polyurethane methacrylate obtained by adding acrylic acid or methacrylic acid to polyurethane obtained by the reaction of well-known polyol or diol with polyisocyanate can also be used.

Radiation-curable compounds obtained by adding acrylic acid or methacrylic acid to bisphenol A, bisphenol F, hydrogenated bisphenol A, hydrogenated bisphenol F, and alkylene oxide adducts of these compounds, and compounds having a cyclic structure, e.g., isocyanuric acid alkylene oxide-modified diacrylate, isocyanuric acid alkylene oxide-modified dimethacrylate, tricyclodecanedimethanol diacrylate and tricyclodecanedimethanol dimethacrylate can also be used.

The specific examples of the trifunctional radiation-curable compounds include trimethylolpropane triacrylate, trimethylolethane triacrylate, alkylene oxide-modified triacrylate of trimethylolpropane, pentaerythritol triacrylate, dipentaerythritol triacrylate, isocyanuric acid alkylene oxide-modified triacrylate, propionic acid dipentaerythritol triacrylate, hydroxypivaloyl aldehyde-modified dimethylolpropane triacrylate, trimethylolpropane trimethacrylate, alkylene oxide-modified trimethacrylate of trimethylolpropane, pentaerythritol trimethacrylate, dipentaerythritol trimethacrylate, isocyanuric acid alkylene oxide-modified trimethacrylate, propionic acid dipentaerythritol trimethacrylate, and hydroxypivaloyl aldehyde-modified dimethylolpropane trimethacrylate.

The specific examples of the tetrafunctional or higher radiation-curable compounds include pentaerythritol tetraacrylate, ditrimethylolpropane tetraacrylate, dipentaerythritol pentaacrylate, propionic acid dipentaerythritol tetraacrylate, dipentaerythritol hexaacrylate, and alkylene oxide-modified hexaacrylate of phosphagene.

Of these compounds, bifunctional acrylate compounds having a molecular weight of from 200 to 2,000 are preferred, and compounds obtained by adding acrylic acid or methacrylic acid to bisphenol A, bisphenol F, hydrogenated bisphenol A, hydrogenated bisphenol F, and alkylene oxide adducts of these compounds are more preferred.

The radiation-curable compounds for use in the present invention may be used in combination with polymer type binders. As the binders, the high polymers described in the above means 1), well-known thermoplastic resins, thermosetting resins, reactive resins and mixtures of these compounds are used.

When ultraviolet rays are used as radiation, it is preferred to use a polymerization initiator in combination. As the polymerization initiator, a photo-radical polymerization initiator, a photo-cationic polymerization initiator and a photo-amine generator can be used.

The examples of photo-radical polymerization agents include α-diketones, e.g., benzyl and diacetyl; acyloins, e.g., benzoin; acyloin ethers, e.g., benzoin methyl ether, benzoin ethyl ether and benzoin isopropyl ether; thioxanthones, e.g., thioxanthone, 2,4-diethylthioxanthone and thioxanthone-4-sulfonic acid; benzophenones, e.g., benzophenone, 4,4'-bis(dimethylamino)benzophenone, and 4,4'-bis(diethylamino) benzophenone; Michler's ketones; acetophenones, e.g., acetophenone, 2-(4-toluenesulfonyloxy)-2-phenylacetophenone, p-dimethylaminoacetophenone, α,α'-dimethoxyacetoxybenzophenone, 2,2'-dimethoxy-2-phenylacetophenone, p-methoxyacetophenone, 2-methyl-[4-(methylthio)phenyl]-2-morpholino-1-propanone, and 2-benzyl-2-dimethylamino-1-(4-morpholinophenyl)butan-1-one; quinones, e.g., anthraquinone and 1,4-naphthoquinone; halogen compounds, e.g., phenacylchloride, trihalomethylphenylsulfone, and tris(trihalomethyl)-s-triazine; acylphosphine oxides; and peroxide, e.g., di-t-butyl peroxide.

As the photo-radical polymerization agent, commercially available products can also be used, e.g., IRGACURE-184, -261, -369, -500, -651 and -907 (manufactured by Ciba Geigy Japan Limited), Darocur-1173, -1116, -2959, -1664 and -4043 (manufactured by Merck Japan Ltd.), KAYACURE-DETX, KAYACURE-MBP, KAYACURE-DMBI, KAYACURE-EPA and KAYACURE-OA (manufactured by Nippon Kayaku Co., Ltd.), VICURE-10 and VICURE-55 (manufactured by STAUFFER Co., Ltd.), TRIGONAL P1 (manufactured by AKZO Co., Ltd.), SANDORAY 1000 (manufactured by SANDOZ Co., Ltd.), DEAP (manufactured by APJOHN Co., Ltd.), QUANTACURE-PDO, QUANTACURE-ITX and QUANTACURE-EPD (manufactured by WARD BLEKINSOP Co., Ltd.) can be used.

As the photo-cationic polymerization initiator, diazonium salts, triphenylsulfonium salts, metallocene compounds, diaryl iodonium salts, nitrobenzyl sulfonates, α-sulfonyloxy ketones, diphenyldisulfones, and imidyl sulfonattes are exemplified.

As the photo-cationic polymerization initiator, commercially available products can also be used, e.g., Adeka Ultraset PP-33, OPTOMER SP-150 and 170 (diazonium salts), OPTOMER SP-150 and 170 (sulfonium salts) (manufactured by Asahi Denka Kogyo Co., Ltd.), and IRGACURE 261 (metallocene compound) (manufactured by Ciba Geigy Japan Limited) can be used.

As the photo-amine generator, nitrobenzcarbamates and iminosulfonates are exemplified. These photopolymerization initiators are arbitrarily selected according to exposure conditions (e.g., whether oxygen atmosphere or oxygen free atmosphere). These photopolymerization initiators can be used in combination of two or more.

Compositions containing a radiation-curable compound and, further, other binders and photopolymerization initiators are made coating solutions in a solvent which dissolves these compositions. The solvent is arbitrarily selected from the solvents exemplified in means 1).

After the coating solution is coated on a support and dried, generally the coated layer is irradiated with radiation. Drying may be either natural drying or drying by heating.

When electron beam is used as the radiation, the dose is preferably from 1 to 20 Mrad in total, and more preferably from 3 to 10 Mrad.

When ultraviolet ray is used as the radiation, the dose is preferably from 10 to 100 mJ/cm$^2$.

Regarding the irradiating apparatus of ultraviolet ray (UV) and electron beam (EB), and irradiating conditions, well-known apparatus and conditions can be used, e.g., those described in *UV•EB Koka Gijutsu (Hardening Techniques of UV and EB)*, Sogo Gijutsu Center Co., and *Tei Energy Denshi-sen Shosha no Oyo Gijutsu (Applied Technology of Low Energy Electron Beam Irradiation)*, CMC Co. (2000).

The thickness of a smooth coating layer depends upon the constituents of a smooth coating layer, but the above-described range is preferred. In the case of a magnetic tape, the thinner the thickness, the more preferred is it to realize high capacity, so long as the surface property and physical strength of a smooth coating layer are secured.

A filler may be added to the coating solution of a smooth coating layer for the purpose of obtaining a desired surface property. The largest diameter of a filler is preferably 50 nm or less. When the diameter exceeds 50 nm, sometimes it causes dropout (DO).

However, a tape-like magnetic recording medium may be formed by coating a backing layer on the other side of the support by changing the composition of the coating solution of a smooth coating layer to form a smooth coating layer which is out of the range of the present invention. In such a case, a layer having other composition may further be coated on the smooth coating layer.

It is desired that a smooth coating layer is stable to a magnetic layer coating solution and a nonmagnetic layer coating solution. Accordingly, the elution (amount) of a smooth coating layer in a mixed solution of methyl ethyl ketone (MEK)/cyclohexanone (1/1) is preferably from 0.0 to 0.4 mg/cm$^2$, and more preferably from 0.0 to 0.2 mg/cm$^2$.

A magnetic layer formed in the present invention is suitable for a coating type magnetic recording medium comprising a ferromagnetic powder and a binder as main components, but a magnetic layer may be a ferromagnetic metal thin layer. In the latter case, a magnetic layer can be formed by well-known techniques, such as deposition or sputtering.

In the case of a coating type magnetic layer, the thickness of a magnetic layer is preferably from 0.02 to 0.5 μm, and more preferably from 0.05 to 0.2 μm.

Further, it is preferred to provide a magnetic layer on a nonmagnetic layer (also referred to as "a lower layer") containing a nonmagnetic powder and a binder provided on a smooth coating layer. The thickness of a nonmagnetic layer is preferably from 0.5 to 3.0 μm, and more preferably from 0.8 to 2.0 μm.

It is preferred that a magnetic layer (also referred to as "an upper layer" or "an upper magnetic layer") and a nonmagnetic layer are provided by wet-on-wet (W/W) coating of providing a magnetic layer while a nonmagnetic layer is still wet.

When a nonmagnetic layer and a magnetic layer are provided on a smooth coating layer, it is preferred that a nonmagnetic layer and a magnetic layer are provided on a support, which carries the smooth coating layer, in the state of not being wound after the smooth coating layer has been coated, but a support in a rolled state may be used.

With respect to the case where the present invention is applied to a coating type magnetic recording medium (i.e., a magnetic recording particulate medium), every constituent is described below.

Magnetic Layer

A lower layer and an ultrathin magnetic layer of the magnetic recording medium in the present invention may be provided on either one side of a support or may be provided on both sides. An upper magnetic layer may be coated while a lower layer coated is still wet (W/W coating) or may be coated after a lower layer coated is dried (W/D coating). Simultaneous or successive wet-on-wet coating is preferred in view of the productivity but wet-on-dry coating can be sufficiently used in the case of a disc. In multilayer construction according to the present invention, since an upper layer and a lower layer can be formed simultaneously or successively (with W/W coating), a surface treatment step, e.g., a calendering step, can be utilized effectively and surface roughness of an upper magnetic layer can be improved even a layer is an ultrathin layer. The coercive force (Hc) of a magnetic layer is preferably 160 kA/m or more, and Bm (maximum magnetic flux density) of ferromagnetic metal powders is preferably from 0.2 to 0.5 T and of hexagonal ferrite powders is preferably from 0.1 to 0.3 T.

Ferromagnetic Powder

The ferromagnetic metal powders which are used in a magnetic layer according to the present invention are not particularly limited but ferromagnetic metal powders and hexagonal ferrite powders containing α-Fe as a main component are preferably used. These ferromagnetic metal powders may contain, in addition to the prescribed atoms, the following atoms, e.g., Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr and B. In particular, it is preferred to contain at least one of Al, Si, Ca, Y, Ba, La, Nd, Co, Ni and B, in addition to α-Fe, and it is more preferred to contain at least one of Co, Y and Al in addition to α-Fe. The content of Co is preferably from 0 to 40 atomic %, more preferably from 15 to 35 atomic %, and most preferably from 20 to 35 atomic %, the content of Y is preferably from 1.5 to 12 atomic %, more preferably from 3 to 10 atomic %, and most preferably from 4 to 9 atomic %, and the content of Al is preferably from 1.5 to 12 atomic %, more preferably from 3 to 10 atomic %, and most preferably from 4 to 9 atomic %, each based on Fe. These ferromagnetic powders may be previously treated with the later described dispersant, lubricant, surfactant and antistatic agent before dispersion. The specific examples thereof are disclosed in Japanese Patent Publication Nos. 14090/1969, 18372/1970, 22062/1972, 22513/1972, 28466/1971, 38755/1971, 4286/1972, 12422/1972, 17284/1972, 18509/1972, 18573/1972, 10307/1964, 39639/1971, U.S. Pat. Nos. 3,026,215, 3,031,341, 3,100,194, 3,242,005 and 3,389,014.

Ferromagnetic metal powders may contain a small amount of a hydroxide or oxide. Ferromagnetic metal powders manufactured by well-known methods may be used, such as a method comprising reducing a composite organic acid salt (mainly an oxalate) with a reducing gas, e.g., hydrogen; a method comprising reducing an iron oxide with a reducing gas, e.g., hydrogen, to obtain Fe or Fe—Co particles; a method comprising pyrolysis of a metal carbonyl compound; a method comprising adding to an aqueous solution of a ferromagnetic metal a reducing agent, e.g., sodium boronhydride, hypophosphite, or hydrazine, to effect reduction; and a method comprising evaporating a metal in a low pressure inert gas to obtain a fine powder. The thus-obtained ferromagnetic metal powders which are subjected to well-known gradual oxidization treatment can be used in the present invention, e.g., a method of immersing the powders in an organic solvent, then drying; a method of immersing the powders in an organic solvent, then charging an oxygen-containing gas to form oxide films on the surfaces thereof and then drying; and a method of forming oxide films on the surfaces of the powders by regulating partial pressure of an oxygen gas and an inert gas without using an organic solvent.

Ferromagnetic metal powders which are used in a magnetic layer according to the present invention have a specific surface area ($S_{BET}$) as measured by the BET method of preferably from 45 to 80 $m^2$/g, and more preferably from 50 to 70 $m^2$/g. When the specific surface area is less than 45 $m^2$/g, noise increases and when more than 80 $m^2$/g, good surface property is obtained with difficulty, which is not preferred. Ferromagnetic metal powders for use in a magnetic layer according to the present invention have a crystallite size of preferably from 80 to 180 angstroms, more preferably from 100 to 180 angstroms, and particularly preferably from 110 to 175 angstroms. The long axis length of ferromagnetic metal powders is preferably from 0.01 to 0.15 μm, more preferably from 0.03 to 0.15 μm, and particularly preferably from 0.03 to 0.12 μm. Ferromagnetic metal powders preferably have an acicular ratio of from 3 to 15, more preferably from 5 to 12. Ferromagnetic metal powders have a saturation magnetization ($\sigma_s$) of generally from 100 to 180 A·$m^2$/kg, preferably from 110 to 170 A·$m^2$/kg, and more preferably from 125 to 160 A·$m^2$/kg. Ferromagnetic metal powders have a coercive force (Hc) of preferably from 160 to 280 kA/m, and more preferably from 176 to 240 kA/m.

Ferromagnetic metal powders preferably have a water content of from 0.01 to 2%. The water content of ferromagnetic metal powders is preferably optimized by selecting the kinds of binders. The pH of ferromagnetic metal powders is preferably optimized by the combination with the binder to be used. The pH range is from 4 to 12, preferably from 6 to 10. Ferromagnetic metal powders may be surface-treated with Al, Si, P or oxides thereof, if necessary. The amount thereof is from 0.1 to 10% based on the ferromagnetic metal powders. Adsorption of a lubricant, e.g., fatty acid, becomes 100 mg/$m^2$ or less by performing a surface treatment, which is, therefore, preferred. Soluble inorganic ions (e.g., Na, Ca, Fe, Ni and Sr) are sometimes contained in ferromagnetic metal powders. It is preferred substantially not to contain such soluble inorganic ions but the properties of ferromagnetic metal powders are not particularly affected if the content is 200 ppm or less. Ferromagnetic metal powders for use in the present invention preferably have less voids and the value thereof is 20% by volume or less, more preferably 5% by volume or less. The figure of ferromagnetic metal powders is not particularly limited, and any figure such as an acicular, ellipsoidal or spindle figure may be used, so long as the characteristics as to the particle size of ferromagnetic metal powders described above are satisfied. Switching Field Distribution (SFD) of a ferromagnetic metal powder itself is preferably small, preferably 0.8 or less. It is necessary to make Hc distribution of ferromagnetic metal powders narrow. When SFD is 0.8 or less, electromagnetic characteristics are excellent, high output can be obtained, magnetic flux revolution becomes sharp and peak shift is less, therefore, suitable for high density digital magnetic recording. For achieving small Hc distribution, making particle size distribution of goethite in ferromagnetic metal powders good and preventing sintering are effective methods.

Hexagonal ferrite powders are described below. The examples of hexagonal ferrite powders which are used in the present invention include substitution products of barium ferrite, strontium ferrite, lead ferrite and calcium ferrite and Co substitution products. Specifically, magnetoplumbite type barium ferrite and strontium ferrite, magnetoplumbite type ferrite having covered the particle surfaces with spinel, magnetoplumbite type barium ferrite and strontium ferrite partially containing spinel phase are exemplified. Hexagonal ferrite powders may contain, in addition to the prescribed atoms, the following atoms, e.g., Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge and Nb. In general, hexagonal ferrite powders containing the following elements can be used, e.g., Co—Zn, Co—Ti, Co—Ti—Zr, Co—Ti—Zn, Ni—Ti—Zn, Nb—Zn—Co, Sb—Zn—Co and Nb—Zn. According to starting materials and producing processes, specific impurities may be contained.

The particle size of hexagonal ferrite powders is a hexagonal tabular diameter and is generally from 10 to 100 nm, preferably from 10 to 60 nm, and particularly preferably from 10 to 50 nm. When reproduction is performed using an MR head, particularly for increasing track density, it is necessary to reduce noise, accordingly the tabular diameter is preferably 40 nm or less, but if it is smaller than 10 nm, stable magnetization cannot be obtained due to thermal fluctuation. On the other hand, when the particle size is more than 100 nm, noise increases, therefore, both of such particle diameters are not suitable for high density recording. A tabular ratio (tabular diameter/tabular thickness) is preferably from 1 to 15, more preferably from 1 to 7. When a tabular ratio is small, the packing density in a magnetic layer becomes high, which is preferred but satisfactory orientation cannot be obtained. When a tabular ratio is higher than 15, noise increases due to stacking among particles. The specific surface area ($S_{BET}$) measured by the BET method of the particles having diameters within this range is generally from 10 to 100 m$^2$/g. A specific surface area nearly coincides with the value obtained by arithmetic operations from a tabular diameter and a tabular thickness. Distributions of tabular diameter and tabular thickness are generally preferably as narrow as possible. Distributions of specific surface area in numerical values can be compared by measuring TEM photographs of 500 particles selected randomly. Distributions are in many cases not regular distributions, but when expressed by the standard deviation to the average size from calculation, a/average size is from 0.1 to 2.0. For obtaining narrow particle size distribution, it is efficient to make a particle-forming reaction system homogeneous as far as possible, and particles formed are subjected to distribution-improving treatments as well. For example, a method of selectively dissolving ultrafine particles in an acid solution is also known. Coercive force (Hc) measured in magnetic powders of generally from about 40 to about 400 kA/m can be produced. Higher Hc is advantageous for high density recording but Hc is restricted by capacities of recording heads. Hc of the magnetic powders according to the present invention is from about 160 to about 320 kA/m, preferably from 176 to 280 kA/m. When saturation magnetization of heads is more than 1.4 tesla, Hc of 176 kA/m or more is preferred. Hc can be controlled by particle diameters (tabular diameter/tabular thickness), the kinds and amounts of elements contained, substitution sites of elements, and reaction conditions of particle formation. Saturation magnetization ($\sigma_s$) is from 40 to 80 A·m$^2$/kg. $\sigma_s$ is preferably higher but it has inclination of becoming smaller as particles become finer. For improving $\sigma_s$, it is well known to make composite of magnetoplumbite ferrite with spinel ferrite, to select kinds and amounts of elements to be contained, or W type hexagonal ferrite can also be used. Further, when magnetic powders are dispersed, particle surfaces of magnetic powders may be treated with substances compatible with the dispersion media and polymers. Inorganic or organic compounds are used as a surface treating agent. For example, oxides or hydroxides of Si, Al and P, various kinds of silane coupling agents, and various kinds of titanium coupling agents are representative examples of the surface treating agent. The amount of these surface treating agents is from 0.1 to 10% based on the amount of the magnetic powder. The pH of magnetic powders is also important for dispersion, and pH is in general from 4 to 12 or so. The optimal value is dependent upon the dispersion medium and the polymer. Taking chemical stability and storage stability of magnetic media into consideration, pH of from 6 to 11 or so is selected. The water content in a magnetic powder also affects dispersion. The optimal value is dependent upon the dispersion medium and the polymer, and the water content of from 0.01 to 2.0% is selected in general. Producing methods of hexagonal ferrite include the following and any of these methods can be used in the present invention: (1) a glass crystallization method in which metal oxides which substitute barium oxide, iron oxide and iron, and boron oxide and the like as a glass forming material are mixed so as to make a desired ferrite composition, melted, and then quenched to obtain an amorphous product, the obtained product is reheat-treated, washed and then pulverized to obtain a barium ferrite crystal powder, (2) a hydrothermal reaction method in which a solution of metal salt of barium ferrite composition is neutralized with an alkali, by products are removed, followed by liquid phase heating at 100° C. or more, washing, drying and then pulverization to obtain a barium ferrite crystal powder, and (3) a coprecipitation method in which a solution of metal salt of barium ferrite composition is neutralized with an alkali, byproducts are removed, followed by drying, treatment at 1,100° C. or less, and then pulverization to obtain a barium ferrite crystal powder.

Nonmagnetic Layer

A nonmagnetic lower layer which is provided between a support and a magnetic layer is described in detail below. The constitution of a lower layer in the present invention is not particularly limited so long as it is substantially nonmagnetic but, in general, a lower layer comprises at least a resin, preferably comprises a powder, e.g., an inorganic or organic powder, dispersed in a resin. The inorganic powder is in general preferably a nonmagnetic powder, but a magnetic powder can also be used so long as a lower layer is substantially nonmagnetic.

Nonmagnetic powders can be selected from inorganic compounds, e.g., metallic oxide, metallic carbonate, metallic sulfate, metallic nitride, metallic carbide and metallic sulfide. The examples of inorganic compounds are selected from the following compounds and they can be used alone or in combination, e.g., alpha-alumina having an alpha-conversion rate of 90% or more, beta-alumina, gamma-alumina, theta-alumina, silicon carbide, chromium oxide, cerium oxide, alpha-iron oxide, hematite, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide. Of these compounds, titanium dioxide, zinc oxide, iron oxide and barium sulfate are particularly preferred because they have small particle size distribution and various means for imparting functions, and titanium dioxide and alpha-iron oxide are more preferred. These nonmagnetic powders preferably have a particle size of from 0.005 to 2 µm. A plurality of nonmagnetic powders each having a different particle size may be combined, if necessary, or a single nonmagnetic powder having a broad particle size distribution may be used so as to attain the same effect as such a combination. A particularly preferred particle size of nonmagnetic powders is from 0.01 to 0.2 µm. In particular, when nonmagnetic powders are granular metallic oxides, the average particle size is preferably 0.08 µm or less, and when nonmagnetic powders are acicular metallic oxides, the long axis length is preferably 0.3 µm or less, and more preferably 0.2 µm or less. Nonmagnetic powders for use in the present invention have a tap density of from 0.05 to 2 g/ml, and preferably from 0.2 to 1.5 g/ml; a water content of generally from 0.1 to 5 mass % (i.e., weight %), preferably from 0.2 to 3 mass %, and more preferably from 0.3 to 1.5 mass %; and a pH value of generally from 2 to 11, and particularly preferably from 5.5 and 10; a specific surface area ($S_{BET}$) of generally from 1 to 100 m$^2$/g, preferably from 5 to 80 m$^2$/g, and more preferably from 10 to 70 m$^2$/g; acrystallite size of preferably from 0.004 to 1 µm, and more preferably from 0.04 to 0.1 µm; an oil absorption amount using DBP (dibutyl phthalate) of from 5 to 100 ml/100 g, preferably from 10 to 80 ml/100 g, and more preferably from 20 to 60 ml/100 g; and a specific gravity of generally from 1 to 12, preferably from 3 to 6. The figure of nonmagnetic powders may be any of acicular, spherical, polyhedral and tabular figures. Nonmagnetic powders preferably have a Mohs' hardness of from 4 to 10. The SA (stearic acid) adsorption amount of nonmagnetic powders is from 1 to 20 µmol/m$^2$, preferably from 2 to 15 µmol/m$^2$, and more preferably from 3 to 8 µmol/m$^2$. The pH value of nonmagnetic powders is preferably between 3 and 6. The surfaces of these nonmagnetic powders are preferably covered with $Al_2O_3$, $SiO_2$, $TiO_2$, $ZrO_2$, $SnO_2$, $Sb_2O_3$, $ZnO$ or $Y_2O_3$. $Al_2O_3$, $SiO_2$, $TiO_2$ and $ZrO_2$ are preferred in the point of dispersibility, and $Al_2O_3$, $SiO_2$ and $ZrO_2$ are more preferred. These surface-covering agents can be used in combination or may be used alone. Surface treatment may be performed by coprecipitation, alternatively, surface treatment of particles may be previously performed to be covered with alumina in the first place, then the alumina-covered surface maybe covered with silica, or vice versa, according to purposes. A surface-covered layer may be porous, if necessary, but a homogeneous and dense surface is generally preferred.

The specific examples of nonmagnetic powders for use in the lower layer according to the present invention include Nanotite (manufactured by Showa Denko Co., Ltd.), HIT-100 and ZA-G1 (manufactured by Sumitomo Chemical Co., Ltd.), alpha-hematite DPN-250, DPN-250BX, DPN-245, DPN-270BX, DPN-500BX, DBN-SA1 and DBN-SA3 (manufactured by Toda Kogyo Co., Ltd.), titanium oxide TTO-51B, TTO-55A, TTO-55B, TTO-55C, TTO-55S, TTO-55D and SN-100, and alpha-hematite E270, E271, E300 and E303 (manufactured by Ishihara Sangyo Kaisha Ltd.), titanium oxide STT-4D, STT-30D, STT-30 and STT-65C, and alpha-hematite alpha-40 (manufactured by Titan Kogyo Co., Ltd.), MT-100S, MT-100T, MT-150W, MT-500B, MT-600B, MT-100F and MT-500HD (manufactured by Tayca Corp.), FINEX-25, BF-1, BF-10, BF-20 and ST-M (manufactured by Sakai Chemical Industry Co., Ltd.), DEFIC-Y and DEFIC-R (manufactured by Dowa Mining Co., Ltd.), AS2BM and TiO$_2$ P25 (manufactured by Nippon Aerosil Co., Ltd.), and 100A, 500A and calcined products thereof (manufactured by Ube Industries, Ltd.). Particularly preferred nonmagnetic powders are titanium dioxide and alpha-iron oxide.

A desired micro Vickers' hardness can be obtained by incorporating carbon blacks into a lower layer, in addition, surface electrical resistance (Rs) and light transmittance can be reduced, which are well-known effects. Further, it is also possible to obtain the effect of stocking a lubricant by incorporating carbon blacks into a lower layer. Furnace blacks for rubbers, thermal blacks for rubbers, carbon blacks for coloring and acetylene blacks can be used as carbon blacks. Carbon blacks used in a lower layer should optimize the following characteristics by the desired effects and sometimes more effects can be obtained by the combined use of carbon blacks.

Carbon blacks for use in a lower layer according to the present invention have a specific surface area ($S_{BET}$) of generally from 100 to 500 m$^2$/g, and preferably from 150 to 400 m$^2$/g, a DBP oil absorption of generally from 20 to 400 ml/100 g, and preferably from 30 to 400 ml/100 g, a particle size of generally from 5 to 80 nm, preferably from 10 to 50 nm, and more preferably from 10 to 40 nm, pH of preferably from 2 to 10, a water content of preferably from 0.1 to 10%, and a tap density of preferably from 0.1 to 1 g/ml. The specific examples of carbon blacks for use in a lower layer according to the present invention include BLACKPEARLS 2000, 1300, 1000, 900, 800, 880 and 700, and VULCAN XC-72 (manufactured by Cabot Co., Ltd.), #3050B, #3150B, #3250B, #3750B, #3950B, #950, #650B, #970B, #850B, MA-600, MA-230, #4000 and #4010 (manufactured by Mitsubishi Kasei Corp.), CONDUCTEX SC, RAVEN 8800, 8000, 7000, 5750, 5250, 3500, 2100, 2000, 1800, 1500, 1255 and 1250 (manufactured by Columbia Carbon Co., Ltd.), and Ketjen Black EC (manufactured by Akzo Co., Ltd.). Carbon blacks for use in the present invention may previously be surface-treated with a dispersant, may be grafted with a resin, or a part of the surface may be graphitized before use. Carbon blacks may be previously dispersed in a binder before being added to a coating solution. Carbon blacks can be used within the range not exceeding 50 mass % (i.e., weight %) based on the above inorganic powders and not exceeding 40 mass % based on the total mass (i.e., the total weight) of the nonmagnetic layer. These carbon blacks can be used alone or in combination. Regarding carbon blacks which can be used in the present invention, the description in *Carbon Black Binran* (*Handbook of Carbon Blacks*) (compiled by Carbon Black Association of Japan) can be referred to, for example.

Organic powders can be used in the lower layer according to the purpose. The examples of organic powders include an acryl styrene resin powder, a benzoguanamine resin powder, a melamine resin powder and a phthalocyanine pigment. Besides the above organic powders, a polyolefin resin powder, a polyester resin powder, a polyamide resin powder, a polyimide resin powder, and a polyethylene fluoride resin powder can also be used. The producing methods of these resin powders are disclosed in Japanese Patent (Application) Laid-Open Nos. 18564/1987 and 255827/1985.

Binder resins, lubricants, dispersants, additives, solvents, dispersing methods, and others which are used in a magnetic layer described below can be used in a lower layer. In particular, with respect to the amounts and kinds of binder resins, additives, the amounts and kinds of dispersants, well-known prior art techniques regarding the magnetic layer can be applied to a lower layer.

Binder

Conventionally well-known thermoplastic resins, thermosetting resins, reactive resins and mixtures of these resins are used as a binder in the present invention. Thermoplastic resins having a glass transition temperature of from −100 to 150° C., a number average molecular weight of from 1,000 to 200,000, preferably from 10,000 to 100,000, and a polymerization degree of from about 50 to about 1,000 can be used in the present invention.

The examples such resins include polymers or copolymers containing as a constituting unit the following compounds, e.g., vinyl chloride, vinyl acetate, vinyl alcohol, maleic acid, acrylic acid, acrylate, vinylidene chloride, acrylonitrile, methacrylic acid, methacrylate, styrene, butadiene, ethylene, vinyl butyral, vinyl acetal and vinyl ether; polyurethane resins and various rubber resins. The examples of thermosetting resins and reactive resins which can be used in the present invention include phenol resins, epoxy resins, curable type polyurethane resins, urea resins, melamine resins, alkyd resins, acrylic reactive resins, formaldehyde resins, silicone resins, epoxy-polyamide resins, mixtures of polyester resins and isocyanate prepolymers, mixtures of polyesterpolyol and polyisocyanate, and mixtures of polyurethane and polyisocyanate. These resins are described in detail in *Plastic Handbook,* published by Asakura Shoten. It is also possible to use well-known electron beam-curable resins in each layer. The examples of these resins and producing methods are disclosed in detail in Japanese Patent Laid-Open No. 256219/1987. These resins can be used alone or in combination. The examples of preferred combinations include combinations of at least one selected from vinyl chloride resins, vinyl chloride-vinyl acetate copolymers, vinyl chloride-vinyl acetate-vinyl alcohol copolymers, and vinyl chloride-vinyl acetate-maleic anhydride copolymers with polyurethane resins, or combinations of these resins with polyisocyanate.

As polyurethane resins, those having well-known structures can be used, e.g., polyester polyurethane, polyether polyurethane, polyether polyester polyurethane, polycarbonate polyurethane, polyester polycarbonate polyurethane and polycaprolactone polyurethane. Concerning every binder shown above, it is preferred that at least one polar group selected from the following groups is introduced by copolymerization or addition reaction for the purpose of obtaining further excellent dispersibility and durability, e.g., —COOM, —SO$_3$M, —OSO$_3$M, —P=O(OM)$_2$, —O—P=O(OM)$_2$ (wherein M represents a hydrogen atom, or an alkali metal salt group), —OH, —NR$^2$, —N$^+$R$_3$ (R represents a hydrocarbon group), an epoxy group, —SH and —CN. The content of these polar groups is from $10^{-1}$ to $10^{-8}$ mol/g, and preferably from $10^{-2}$ to $10^{-6}$ mol/g.

The specific examples of binders for use in the present invention include VAGH, VYHH, VMCH, VAGF, VAGD, VROH, VYES, VYNC, VMCC, XYHL, YXSG, PKHH, PKHJ, PKHC and PKFE (manufactured by Union Carbide Co., Ltd.), MPR-TA, MPR-TA5, MPR-TAL, MPR-TSN, MPR-TMF, MPR-TS, MPR-TM and MPR-TAO (manufactured by Nisshin Chemical Industry Co., Ltd.), 1000W, DX80, DX81, DX82, DX83 and 100FD (manufactured by Electro Chemical Industry Co., Ltd.), MR-104, MR-105, MR-110, MR-100, MR-555 and 400X-110A (manufactured by Nippon Zeon Co., Ltd.), Nippoll an N2301, N2302 and N2304 (manufactured by Nippon Polyurethane Co., Ltd.), Pandex T-5105, T-R3080, T-5201, Burnock D-400, D-210-80, Crisvon 6109 and 7209 (manufactured by Dainippon Ink and Chemicals Inc.), Vylon UR8200, UR8300, UR8700, RV530 and RV280 (manufactured by Toyobo Co., Ltd.), Daipheramine 4020, 5020, 5100, 5300, 9020, 9022 and 7020 (manufactured by Dainichi Seika K.K.), MX5004 (manufactured by Mitsubishi Kasei Corp.), Sunprene SP-150 (manufactured by Sanyo Chemical Industries Co. Ltd.), and Salan F310 and F210 (manufactured by Asahi Chemical Industry Co., Ltd.).

The amount of a binder for use in a nonmagnetic layer and a magnetic layer according to the present invention is from 5 to 50 mass %, and preferably from 10 to 30 mass %, based on the amount of the nonmagnetic powder or the ferromagnetic powder. When vinyl chloride resins are used as a binder, the amount of a binder is from 5 to 30 mass %, when polyurethane resins are used, the amount is from 2 to 20 mass %, and also it is preferred that polyisocyanate is used in an amount of from 2 to 20 mass % in combination with these binders. However, for instance, when head corrosion is caused by a slight amount of chlorine due to dechlorination, it is also possible to use polyurethane alone or a combination of polyurethane and isocyanate alone. When polyurethane is used in the present invention, it is preferred that polyurethane has a glass transition temperature of from −50 to 150° C., preferably from 0 to 100° C., and more preferably from 30 to 90° C., breaking extension of from 100 to 2,000%, breaking stress of generally from 0.05 to 10 kg/mm$^2$ (=about 0.49 to 98 MPa), and a yielding point of from 0.05 to 10 kg/mm$^2$ (=about 0.49 to 98 MPa).

The magnetic recording medium according to the present invention comprise two or more layers. Accordingly, the amount of a binder, the amounts of vinyl chloride resins, polyurethane resins, polyisocyanate or other resins contained in the binder, the molecular weight of each resin constituting a magnetic layer, the amount of polar groups, or the above-described physical properties of resins can of course be varied in a nonmagnetic layer and a magnetic layer, according to necessity. These factors should be rather optimized in respective layers. Well-known prior techniques with respect to the multilayer magnetic layer can be used in the present invention. For example, when the amount of a binder is varied in each layer, it is effective to increase the amount of a binder contained in a magnetic layer to decrease scratches on the surface of the magnetic layer. For improving head touch against a head, it is effective to increase the amount of a binder in a nonmagnetic layer to impart flexibility.

The examples of polyisocyanates for use in the present invention include isocyanates, e.g., tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate; reaction products of these isocyanates with polyalcohols; and polyisocyanates formed by condensation reaction of isocyanates. These polyisocyanates are commercially available under the trade names of Coronate L, Coronate HL, Coronate 2030, Coronate 2031, Millionate MR and Millionate MTL (manufactured by Nippon Polyurethane Co., Ltd.), Takenate D-102, Takenate D-110N, Takenate D-200 and Takenate D-202 (manufactured by Takeda Chemical Industries, Ltd.), and Desmodur L, Desmodur IL, Desmodur N and Desmodur HL (manufactured by Sumitomo Bayer Co., Ltd.). These polyisocyanates may be used alone, or in combinations of two or more taking the advantage of a difference in curing reactivity in each layer.

Carbon Black, Abrasive

The examples of carbon blacks for use in a magnetic layer in the present invention include furnace blacks for rubbers, thermal blacks for rubbers, carbon blacks for coloring and acetylene blacks. Carbon blacks for use in a magnetic layer in the present invention preferably have a specific surface area ($S_{BET}$) of from 5 to 500 m$^2$/g, a DBP oil absorption amount of from 10 to 400 ml/100 g, a particle size of from 5 to 300 nm, preferably from 10 to 250 nm, and more preferably from 20 to 200 nm, pH of from 2 to 10, a water content of from 0.1 to 10%, and a tap density of from 0.1 to 1 g/ml. The specific examples of carbon blacks for use in a magnetic layer of the present invention include BLACK-PEARLS 2000, 1300, 1000, 900, 905, 800 and 700 and VULCAN XC-72 (manufactured by Cabot Co., Ltd.), #80, #60, #55, #50 and #35 (manufactured by Asahi Carbon Co., Ltd.), #2400B, #2300, #900, #1000, #30, #40 and #10B (manufactured by Mitsubishi Kasei Corp.), CONDUCTEX SC, RAVEN 150, 50, 40 and 15, and RAVEN-MT-P (manufactured by Columbia Carbon Co., Ltd.), and Ketjen Black EC (manufactured by Akzo Co., Ltd.). Carbon blacks for use in the present invention may be previously surface-treated with a dispersant, may be grafted with a resin, or a part of the surface may be graphitized before use. Carbon blacks may be previously dispersed in a binder before being added to a magnetic coating solution. These carbon blacks may be used alone or in combination. Carbon blacks are preferably used in an amount of from 0.1 to 30 mass % based on the amount of the magnetic powder. Carbon blacks can serve various functions such as preventing the static charge of a magnetic layer, reducing the friction coefficient, imparting a light-shielding property and improving film strength. Such functions vary depending upon the kind of carbon blacks to be used. Accordingly, it is of course possible in the present invention to select and determine the kinds, amounts and combinations of the carbon blacks to be added to an upper magnetic layer and a lower nonmagnetic layer, on the basis of the above-described various properties such as the particle size, the oil absorption amount, the electroconductivity and the. pH value, or these should be rather optimized in each layer. Regarding carbon blacks for use in a magnetic layer in the present invention, e.g., compiled by Carbon Black Association, *Handbook of Carbon Blacks* can be referred to.

As abrasives which are use in the present invention, well-known materials essentially having a Mohs' hardness of 6 or more may be used alone or in combination, e.g., alpha-alumina having an alpha-conversion rate of 90% or more, beta-alumina, silicon carbide, chromium oxide, cerium oxide, alpha-iron oxide, corundum, artificial diamond, silicon nitride, silicon carbide, titanium carbide, titanium oxide, silicon dioxide, and boron nitride. Composites composed of these abrasives (abrasives obtained by surface-treating with other abrasives) may also be used. Compounds or elements other than the main component are often contained in these abrasives, but the intended effect can be attained so long as the content of the main component is 90% or more. Abrasives preferably have a particle size of from 0.01 to 2 μm, more preferably from 0.05 to 1.0 μm, and particularly preferably from 0.05 to 0.5 μm. In particular, for improving electromagnetic characteristics, abrasives having narrow particle size distribution are preferred. For improving durability, a plurality of abrasives each having a different particle size may be combined according to necessity, or a single abrasive having a broad particle size distribution may be used so as to attain the same effect as such a combination. Abrasives for use in the present invention preferably have a tap density of from 0.3 to 2 g/ml, a water content of from 0.1 to 5%, a pH value of from 2 to 11, and a specific surface area ($S_{BET}$) of from 1 to 30 m$^2$/g. The figure of the abrasives for use in the present invention may be any of acicular, spherical and die-like figures. Abrasives having a figure partly with edges are preferred, because a high abrasive property can be obtained. The specific examples of abrasives for use in the present invention include AKP-12, AKP-15, AKP-20, AKP-30, AKP-50, HIT-20, HIT-30, HIT-55, HIT-60, HIT-70, HIT-80 and HIT-100 (manufactured by Sumitomo Chemical Co., Ltd.), ERC-DBM, HP-DBM and HPS-DBM (manufactured by Reynolds International Inc.), WA10000 (manufactured by Fujimi Kenmazai K.K.), UB20 (manufactured by Uemura Kogyo K. K.), G-5, Chromex U2 and Chromex U1 (manufactured by Nippon Chemical Industrial Co., Ltd.), TF100 and TF140 (manufactured by Toda Kogyo Co., Ltd.), beta-Random Ultrafine (manufactured by Ividen Co., Ltd.), and B-3 (manufactured by Showa Mining Co., Ltd.). These abrasives may be added to a nonmagnetic layer, if necessary. By adding abrasives into a nonmagnetic layer, it is possible to control the surface configuration or prevent abrasives from protruding. The particle sizes and amounts of abrasives to be added to a magnetic layer and a nonmagnetic layer should be selected at optimal values.

Additive

As additives which can be used in a magnetic layer and a nonmagnetic layer in the present invention, additives having a lubricating effect, an antistatic effect, a dispersing effect and a plasticizing effect may be used. The examples of additives which can be used in the present invention include molybdenum disulfide, tungsten disulfide, graphite, boron nitride, graphite fluoride, silicone oils, polar group-containing silicons, fatty acid-modified silicons, fluorine-containing silicons, fluorine-containing alcohols, fluorine-containing esters, polyolefins, polyglycols, alkyl phosphates and alkali metallic salts thereof, alkyl sulfates and alkali metallic salts thereof, polyphenyl ethers, phenylphosphonic acids, alpha-naphthylphosphoric acids, phenylphosphoric acids, diphenylphosphoric acids, p-ethylbenzenephosphonic acids, phenylphosphinic acids, aminoquinones, various kinds of silane coupling agents, titanium coupling agents, fluorine-containing alkyl sulfates and alkaline metallic salts thereof, monobasic fatty acids having from 10 to 24 carbon atoms (which may contain an unsaturated bond or which may be branched) and metallic salts thereof (e.g., with Li, Na, K or Cu), mono-, di-, tri-, tetra-, penta- or hexa-alcohols having from 12 to 22 carbon atoms (which may contain an unsaturated bond or may be branched), alkoxy alcohols having from 12 to 22 carbon atoms (which may contain an unsaturated bond or may be branched), mono-fatty acid esters, di-fatty acid esters or tri-fatty acid esters comprising a monobasic fatty acid having from 10 to 24 carbon atoms (which may contain an unsaturated bond or may be branched) and any one of mono-, di-, tri-, tetra-, penta- and hexa-alcohols having from 2 to 12 carbon atoms (which may contain an unsaturated bond or may be branched), fatty acid esters of monoalkyl ethers of alkylene oxide polymers, fatty acid amides having from 8 to 22 carbon atoms, and aliphatic amines having from 8 to 22 carbon atoms.

The specific examples of fatty acids as additives include capric acid, caprylic acid, lauric acid, myristic acid, palmitic acid, stearic acid, behenic acid, oleic acid, elaidic acid, linolic acid, linolenic acid and isostearic acid. The examples of esters include butyl stearate, octyl stearate, amyl stearate, isooctyl stearate, butyl myristate, octyl myristate, butoxyethyl stearate, butoxydiethyl stearate, 2-ethylhexyl stearate, 2-octyldodecylpalmitate, 2-hexyldodecylpalmitate, isohexadecyl stearate, oleyl oleate, dodecyl stearate, tridecyl stearate, oleyl erucate, neopentyl glycol didecanoate, and ethylene glycol dioleyl, and the examples of alcohols include oleyl alcohol, stearyl alcohol and lauryl alcohol. In addition to the above compounds, the examples of other additives which can be used include nonionic surfactants, e.g., alkylene oxide, glycerol, glycidol or alkylphenol-ethylene oxide adducts; cationic surfactants, e.g., cyclic amines, ester amides, quaternary ammonium salts, hydantoin derivatives, heterocyclic compounds, phosphonium or sulfonium; anionic surfactants containing an acidic group such as carboxylic acid, sulfonic acid, phosphoric acid, a sulfate group or a phosphate group; and amphoteric surfactants, e.g., amino acids, aminosulfonic acids, sulfates or phosphates of amino alcohols, and alkylbetains. The details of these surfactants are described in *Kaimen Kasseizai Binran* (*Handbook of Surfactants*), Sangyo Tosho Publishing Co., Ltd. These lubricants and antistatic agents need not be 100% pure and they may contain impurities such as isomers, non-reacted products, byproducts, decomposed products and oxides, in addition to the main components. However, the content of such impurities is preferably 30% or less, and more preferably 10% or less.

Lubricants and surfactants for use in the present invention respectively have different physical functions. The kinds, amounts and proportions of combination generating a synergistic effect of these lubricants should be determined optimally in accordance with the purpose. A nonmagnetic layer and a magnetic layer can separately contain different fatty acids each having a different melting point so as to prevent bleeding out of the fatty acids to the surface, or different esters each having a different boiling point, a different melting point or a different polarity so as to prevent bleeding out of the esters to the surface. Also, the amounts of surfactants are controlled so as to improve the coating stability, or the amount of a lubricant in an intermediate layer is made larger so as to improve the lubricating effect of the surface thereof. Examples are by no means limited thereto. In general, the total amount of lubricants is from 0.1 to 50%, preferably from 2 to 25%, based on the magnetic powder or nonmagnetic powder.

All or a part of the additives to be used in the present invention may be added to a magnetic coating solution or a nonmagnetic coating solution in any step of the preparation. For example, additives may be blended with a magnetic powder before a kneading step, may be added during a step of kneading a magnetic powder, a binder and a solvent, may be added during a dispersing step, may be added after a dispersing step, or may be added just before coating. According to purpose, there is a case of capable of attaining the object by coating all or a part of additives simultaneously with or successively after coating of a magnetic layer. According to purpose, lubricants may be coated on the surface of a magnetic layer after calendering treatment or after completion of slitting. Well-known organic solvents can be used in the present invention, e.g., organic solvents disclosed in Japanese Patent Laid-Open No. 68453/1994 can be used.

Layer Constitution

The thickness of a support in the magnetic recording medium in the present invention is, for example, from 2 to 100 μm, preferably from 2 to 80 μm. The thickness of a support for a computer tape is from 3.0 to 6.5 μm, preferably from 3.0 to 6.0 μm, and more preferably from 4.0 to 5.5 μm.

A subbing layer (i.e., an undercoating layer) may be provided between a support and a lower layer for adhesion improvement. The thickness of the subbing layer is from 0.01 to 0.5 μm, and preferably from 0.02 to 0.5 μm. The magnetic recording medium in the present invention may be a disc-like medium comprising a lower layer and a magnetic layer provided on both surface sides of a support or a lower layer and a magnetic layer may be provided on either one surface side. When a lower layer and a magnetic layer are provided on only one surface side of a support, a backing layer may be provided on the surface side of the support opposite to the side having the lower layer and the magnetic layer for the purpose of static charge prevention and curling correction. The thickness of the backing layer is from 0.1 to 4 μm, and preferably from 0.3 to 2.0 μm. Well-known subbing layers and backing layers can be used for this purpose.

The thickness of a magnetic layer of the magnetic recording medium of the present invention can be optimally selected according to the saturation magnetization amount of a head to be used, the head gap length, and the recording signal zone. A magnetic layer may comprise two or more layers each having different magnetic characteristics and well-known multilayer magnetic layer structures can be applied to the present invention.

A lower layer exhibits the effect of the present invention so long as it is substantially nonmagnetic, and a lower layer may contain as impurity, or intentionally, a small amount of magnetic powder. "Substantially nonmagnetic" means that the residual magnetic flux density of a lower layer is 0.1 T or less or the coercive force of the lower layer is 8 kA/m or less, preferably the residual magnetic flux density and the coercive force are zero.

Backing Layer

In general, a magnetic tape for a computer data recording is decidedly required to have an excellent repeating-running property as compared with a video tape and an audio tape. For maintaining such high running durability, it is preferred that a backing layer contain a carbon black and an inorganic powder.

It is preferred to use two kinds of carbon blacks each having a different average particle size in combination. In this case, it is preferred to use a fine particle carbon black having an average particle size of from 10 to 20 nm and a coarse particle carbon black having an average particle size of from 230 to 300 nm in combination. In general, by the addition of a fine particle carbon black as above, the surface electrical resistance of a backing layer and also light transmittance can be set at low values. Since there are many kinds of magnetic recording apparatus making use of light transmittance of a tape and making it as signals of operation, the addition of fine particle carbon blacks is particularly effective in such a case. In addition, a fine particle carbon black is in general excellent in retention of a liquid lubricant and contributes to the reduction of a friction coefficient when a lubricant is used in combination. On the other hand, a coarse particle carbon black having a particle size of from 230 to 300 nm has a function as a solid lubricant and forms minute protrusions on the surface of a backing layer, to thereby contribute to reduce a contact area and a friction coefficient.

The specific examples of commercially available fine particle carbon blacks include RAVEN 2000B (18 nm) and RAVEN 1500B (17 nm) (manufactured by Columbia Carbon Co., Ltd.), BP800 (17 nm) (manufactured by Cabot Co., Ltd.), PRINTEX90 (14 nm), PRINTEX95 (15 nm), PRINTEX85 (16 nm), PRINTEX75 (17 nm) (manufactured by Degussa Co.), and #3950 (16 nm) (manufactured by Mitsubishi Kasei Corp.).

The specific examples of commercially available coarse particle carbon blacks include THERMAL BLACK (270 nm) (manufactured by Cancarb Co., Ltd.) and RAVEN MTP (275 nm) (manufactured by Columbia Carbon Co., Ltd.).

When two kinds of carbon blacks each having a different average particle size are used in combination in a backing layer, the proportion of the contents (by mass, i.e., by weight) of a fine particle carbon black having a particle size of from 10 to 20 nm and a coarse particle carbon black having a particle size of from 230 to 300 nm is preferably the former/the latter of from 98/2 to 75/2, and more preferably from 95/5 to 85/15.

The content of a carbon black in a backing layer (the total amount when two kinds are used) is generally from 30 to 80 mass parts (i.e., weight parts), preferably from 45 to 65 mass parts, based on 100 mass parts of the binder.

It is preferred to use two kinds of inorganic powders each having different hardness. Specifically, it is preferred to use a soft inorganic powder having a Mohs' hardness of from 3 to 4.5 and a hard inorganic powder having a Mohs' hardness of from 5 to 9 in combination. By the addition of a soft inorganic powder having a Mohs' hardness of from 3 to 4.5, a friction coefficient can be stabilized against repeating-running. Moreover, a sliding guide pole is not scraped off with the hardness within this range. The average particle size of such a soft inorganic powder is preferably from 30 to 50 nm.

The examples of soft inorganic powders having a Mohs' hardness of from 3 to 4.5 include, e.g., calcium sulfate, calcium carbonate, calcium silicate, barium sulfate, magnesium carbonate, zinc carbonate and zinc oxide. These soft inorganic powders can be used alone or in combination of two or more.

The content of soft inorganic powders in a backing layer is preferably from 10 to 140 mass parts, more preferably from 35 to 100 mass parts, based on 100 mass parts of the carbon black.

By adding a hard inorganic powder having a Mohs' hardness of from 5 to 9 to a backing layer, the strength of the backing layer is increased and running durability is improved. When such hard inorganic powders are used together with carbon blacks and the above-described soft inorganic powders, deterioration due to repeating sliding is reduced and a strong backing layer can be obtained. Appropriate abrasive capability is imparted to a backing layer by the addition of hard inorganic powders and the adhesion of scratched powders to a tape guide pole is reduced. In particular, when a hard inorganic powder is used in combination with a soft inorganic powder, sliding characteristics against a guide pole having a rough surface is improved and the stabilization of a friction coefficient of a backing layer can also be brought about.

The average particle size of hard inorganic powders is preferably from 80 to 250 nm, and more preferably from 100 to 210 nm.

The examples of hard inorganic powders having a Mohs' hardness of from 5 to 9 include, e.g., alpha-iron oxide, alpha-alumina, and chromium oxide ($Cr_2O_3$). These powders may be used alone or in combination. Of the above powders, alpha-iron oxide and alpha-alumina are preferred. The content of hard inorganic powders in a backing layer is generally from 3 to 30 mass parts, preferably from 3 to 20 mass parts, based on 100 mass parts of the carbon black.

When soft inorganic powders and hard inorganic powders are used in combination in a backing layer, it is preferred to use soft inorganic powders and hard inorganic powders selectively such that the difference of hardness between soft and hard inorganic powders is 2 or more, more preferably 2.5 or more, and particularly preferably 3 or more.

It is preferred that the above-described two kinds of inorganic powders each having a specific average particle size and different Mohs' hardness and the above-described two kinds of carbon blacks each having a different average particle size are contained in a backing layer.

Lubricants may be contained in a backing layer. Lubricants which can be used in a backing layer can be arbitrarily selected from among the lubricants which can be used in a nonmagnetic layer or a magnetic layer as described above. The content of lubricants added to a backing layer is generally from 1 to 5 mass parts based on 100 mass parts of the binder.

Support

Supports for use in the present invention are not particularly limited but they are preferably substantially nonmagnetic and flexible supports.

The examples of flexible supports which can be used in the present invention include well-known films such as polyesters (e.g., polyethylene terephthalate and polyethylene naphthalate), polyolefins, cellulose triacetate, polycarbonate, polyimide, polyamideimide, polysulfone, aromatic polyamide, aliphatic polyamide, and polybenzoxazole. Highly strong supports such as polyethylene naphthalate and polyamide are preferably used. If necessary, a lamination type support as disclosed in Japanese Patent Laid-Open No. 224127/1991 can be used to vary the surface roughnesses of a magnetic surface and a base surface. Supports may be subjected to surface treatments, such as corona discharge treatment, plasma treatment, easy adhesion treatment, heat treatment, and dust removing treatment in advance. It is also possible to use an aluminum or glass substrate as a support in the present invention.

For attaining the object of the present invention, it is preferred to use a support having a central plane average surface roughness (Ra) (defined in JIS B 0601) of about 8.0 nm or less measured by TOPO-3D (a product manufactured by WYKO, Arizona, U.S.A.). Since an Ra value can be set up at a low value by virtue of a smooth coating layer, the present invention can sufficiently cope with a support having a relatively large Ra value, which is economically advantageous.

It is preferred that a support is free from coarse protrusions having a height of 0.5 μm or higher. Surface roughness configuration is freely controlled by the size and the amount of fillers added to a support. The examples of such fillers include acryl-based organic fine powders, in addition to oxides and carbonates of Ca, Si and Ti. A support for use in the present invention preferably has a maximum height (Rmax) of 1 μm or less, ten point average roughness (Rz) of 0.5 μm or less, central plane peak height (Rp) of 0.5 μm or less, central plane valley depth (Rv) of 0.5 μm or less, central plane area factor (Sr) of from 10 to 90%, and average wavelength (λa) of from 5 to 300 μm. For obtaining desired electromagnetic characteristics and durability, surface protrusion distribution of a support can be controlled arbitrarily by fillers, e.g., the number of protrusions of sizes of from 0.01 to 1 μm can be controlled each within the number of from 0 to 2,000 per 0.1 $mm^2$.

A support for use in the present invention has an F-5 value of preferably from 5 to 50 kg/$mm^2$ (=about 49 to 490 MPa), a thermal shrinkage factor of a support at 100° C. for 30 minutes of preferably 3% or less, more preferably 1.5% or less, and a thermal shrinkage factor at 80° C. for 30 minutes of preferably 1% or less, more preferably 0.5% or less. A support has a breaking strength of from 5 to 100 kg/mm² (=about 49 to 980 MPa), an elastic modulus of from 100 to 2,000 kg/mm² (=about 0.98 to 19.6 GPa), a temperature expansion coefficient of from $10^{-4}$ to $10^{-8}/°$ C., preferably from $10^{-5}$ to $10^{-6}/°$ C., and a humidity expansion coefficient of $10^{-4}$/RH % or less, preferably $10^{-5}$/RH % or less. These thermal characteristics, dimensional characteristics and mechanical strength characteristics are preferably almost equal in every direction of in-plane of a support with the difference of 10% or less.

Producing Method

Processes of preparing magnetic layer and nonmagnetic layer coating solutions for use in the magnetic recording medium of the present invention comprise at least a kneading step, a dispersing step and, optionally, blending steps to be carried out before and/or after the kneading and dispersing steps. Each of these steps may be composed of two or more separate stages. Materials such as a magnetic powder, a-nonmagnetic powder, a binder, a carbon black, an abrasive, an antistatic agent, a lubricant and a solvent for use in the present invention may be added in any step at any time, and each material may be added in two or more separate steps. For example, polyurethane can be added in parts in a kneading step, a dispersing step, or a blending step for adjusting viscosity after dispersion. For achieving the object of the present invention, the above steps can be performed partly with conventionally well-known producing techniques. It is preferred to use powerful kneading machines such as an open kneader, a continuous kneader, a pressure kneader or an extruder in a kneading step. When a kneader is used, a magnetic powder or a nonmagnetic powder and all or a part of a binder (preferably 30% or more of the total binders) and in the range of from 15 to 500 parts per 100 parts of the magnetic powder are kneading-treated. Details of kneading treatment are disclosed in Japanese Patent Laid-Open Nos. 106338/1989 and 79274/1989. When a magnetic layer solution and a nonmagnetic layer solution are dispersed, glass beads can be used but dispersing media having a high specific gravity are preferably used, e.g., zirconia beads, titania beads and steel beads are suitable for this purpose. Optimal particle size and packing density of these dispersing media should be selected. Well-known dispersing apparatuses can be used in the present invention.

The following methods are preferably used for coating a magnetic recording medium having a multilayer constitution in the present invention. As the first method, a lower layer is coated by any of gravure coating, roll coating, blade coating and extrusion coating apparatuses, which are generally used in the coating of a magnetic coating solution, and then an upper layer is coated while the lower layer is still wet by means of a support pressing type extrusion coating apparatus as disclosed in Japanese Patent Publication No. 46186/1989, Japanese Patent Laid-Open Nos. 238179/1985 and 265672/1990. As the second method, an upper layer and a lower layer are coated almost simultaneously using a coating head equipped with two slits for feeding coating solution as disclosed in Japanese Patent Laid-Open Nos. 88080/1988, 17971/1990 and 265672/1990. As the third method, an upper layer and a lower layer a recoated almost simultaneously using an extrusion coating apparatus equipped with a backup roll as disclosed in Japanese Patent Laid-Open No. 174965/1990. For preventing the electromagnetic characteristics of a magnetic recording medium from deteriorating due to agglomeration of magnetic powders, it is preferred to give shear to the coating solution in a coating head by the methods as disclosed in Japanese Patent Laid-Open Nos. 95174/1987 and 236968/1989. With respect to the viscosity of a coating solution, the range of the numeric values disclosed in Japanese Patent Laid-Open No. 8471/1991 is necessary to be satisfied. For realizing the constitution of the present invention, a successive multilayer coating method of coating a lower layer, drying the lower layer and successively coating a magnetic layer on the lower layer can of course be used without impairing the effect of the present invention. However, for reducing coating defects and improving quality, e.g., the reduction of dropout, it is preferred to use the above simultaneous multilayer coating method.

In the case of a magnetic disc, isotropic orientation can be sufficiently achieved in some cases without performing orientation using an orientation apparatus, but it is preferred to use well-known random orientation apparatuses, e.g., disposing cobalt magnets diagonally and alternately or applying an alternating current magnetic field using a solenoid. Isotropic orientation in ferromagnetic metal powders is in general preferably in-plane two dimensional random orientation, but it may be three dimensional random orientation having perpendicular factors. Hexagonal ferrites in general have an inclination for three dimensional random orientation of in-plane and in the perpendicular direction but it can be made in-plane two dimensional random orientation. It is also possible to impart to hexagonal ferrites isotropic magnetic characteristics in the circumferential direction by perpendicular orientation using well-known methods, e.g., using heteropolar-facing magnets. Perpendicular orientation is preferred particularly when a disc is used for high density recording. Circumferential orientation can be performed using spin coating.

In the case of a magnetic tape, orientation is performed in the machine direction using a cobalt magnet and a solenoid. In orientation, it is preferred that the drying position of the coated film can be controlled by controlling the temperature and the amount of drying air and coating velocity. Coating velocity is preferably from 20 to 1,000 m/min. and the temperature of drying air is preferably 60° C. or more. Appropriate preliminary drying can also be performed before entering a magnet zone.

Heat resisting plastic rollers such as epoxy, polyimide, polyamide and polyimideamide rollers, or metal rollers are used for calendering treatment. Metal rollers are preferably used for the treatment particularly when magnetic layers are coated on both surface sides. Treatment temperature is preferably 50° C. or more, and more preferably 100° C. or more. Linear pressure is preferably 200 kg/cm (=about 196 kN/m) or more, and more preferably 300 kg/cm (=about 294 kN/m) or more.

Physical Properties

The saturation magnetic flux density of a magnetic layer of the magnetic recording medium according to the present invention is from 0.2 to 0.5 T when a ferromagnetic metal fine powder is used, and from 0.1 to 0.3 T when a hexagonal ferrite powder is used. The coercive force (Hc) of a magnetic layer is preferably from 120 to 400 kA/m, preferably from 136 to 240 kA/m. Coercive force distribution is preferably narrow, and SFD (Switching Field Distribution) and SFDr is preferably 0.6 or less.

The squareness ratio of a magnetic disc is from 0.55 to 0.67, preferably from 0.58 to 0.64, in the case of two dimensional random orientation; from 0.45 to 0.55 in the case of three dimensional random orientation; 0.6 or more, preferably 0.7 or more, in the perpendicular direction in the case of perpendicular orientation; and when demagnetization field correction is performed, the squareness ratio is 0.7 or more, preferably 0.8 or more. Degree of orientation is preferably 0.8 or more in both cases of two dimensional random orientation and three dimensional random orientation. In the case of two dimensional random orientation, the squareness ratio, Br and Hc in the perpendicular direction are preferably from 0.1 to 0.5 times as small as those in the in-plane direction.

In the case of a magnetic tape, the squareness ratio is 0.7 or more, and preferably 0.8 or more.

The magnetic recording medium in the present invention has a friction coefficient against head at temperature of from −10° C. to 40° C. and humidity of from 0% to 95% of generally 0.5 or less, preferably 0.3 or less, a surface inherent resistivity of a magnetic layer surface of preferably from $10^4$ to $10^{12}$ ohm/sq, a charge potential of preferably from −500 V to +500 V, an elastic modulus at 0.5% elongation of a magnetic layer of preferably from 100 to 2,000 kg/mm$^2$ (=about 980 to 19,600 N/mm$^2$) in every direction of in-plane, a breaking strength of preferably from 10 to 70 kg/cm$^2$ (=about 98 to 686 N/mm$^2$), an elastic modulus of preferably from 100 to 1,500 kg/mm$^2$ (=about 980 to 14,700 N/mm$^2$) in every direction of in-plane, a residual elongation of preferably 0.5% or less, and a thermal shrinkage factor at every temperature of 100° C. or less of preferably 1% or less, more preferably 0.5% or less, and most preferably 0.1% or less. The glass transition temperature of a magnetic layer (the maximum of loss elastic modulus on dynamic visco-elasticity measurement at 110 Hz) is preferably from 50° C. to 120° C., and that of a lower nonmagnetic layer is preferably from 0° C. to 100° C. The loss elastic modulus is preferably within the range of from $1\times10^3$ to $8\times10^4$ N/cm$^2$, and loss tangent is preferably 0.2 or less. When loss tangent is too great, adhesion failure is liable to occur. These thermal and mechanical characteristics are preferably almost equal in every direction of in-plane of the medium within difference of 10% or less. The residual amount of solvent in a magnetic layer is preferably 100 mg/m$^2$ or less, and more preferably 10 mg/m$^2$ or less. The void ratio of a coating layer is preferably 30% by volume or less, and more preferably 20% by volume or less, with both of a lower layer and an upper layer. The void ratio is preferably smaller for obtaining high output but a specific value should be preferably secured depending upon purposes in some cases. For example, in a disc-like medium which is repeatedly used, large void ratio contributes to good running durability in many cases.

A magnetic layer preferably has a central plane average surface roughness (Ra) of preferably 4.0 nm or less, more preferably 3.8 nm or less, and most preferably 3.5 nm or less, on measuring an area of about 250 μm×250 μm using TOPO-3D (a product manufactured by WYKO, Arizona, U.S.A.). A magnetic layer for use in the present invention preferably has a maximum height (Rmax) of 0.5 μm or less, a ten point average roughness (Rz) of 0.3 μm or less, a central plane peak height (Rp) of 0.3 μm or less, a central plane valley depth (Rv) of 0.3 μm or less, a central plane area factor (Sr) of from 20% to 80%, and an average wavelength (λa) of from 5 to 300 μm. Surface protrusions of a magnetic layer of sizes of from 0.01 to 1 μm can be arbitrarily set in the range of the number of from 0 to 2,000, and it is preferred to optimize electromagnetic characteristics and friction coefficient by setting surface protrusion distribution.

These characteristics can be easily controlled by controlling the surface property of a magnetic layer by fillers in a support, controlling the particle size and the amount of a magnetic powder added to a magnetic layer, or varying the surface configuration of the rollers used in calendering treatment. Curling is preferably within the range of +3 mm.

When the magnetic recording medium according to the present invention comprises a nonmagnetic layer and a magnetic layer, it can be easily presumed that these physical properties can be varied according to purposes in the nonmagnetic layer and the magnetic layer. For example, the elastic modulus of a magnetic layer is made higher to improve running durability and at the same time the elastic modulus of a nonmagnetic layer is made lower than that of a magnetic layer, to thereby improve the head touching of the magnetic recording medium.

EXAMPLE

The present invention will be described in detail below with reference to specific examples, but the present invention should not be construed as being limited thereto.

Formation of Magnetic Tape

Comparative Example I-1

| Preparation of Coating Solution | |
|---|---|
| Magnetic Layer Coating Solution: | |
| Ferromagnetic metal powder | 100 parts |
| Composition: | |
| Co/Fe: 21 atomic % | |
| Al/Fe: 7 atomic % | |
| Y/Fe: 5 atomic % | |
| Average long axis length: 0.06 μm | |
| Average acicular ratio: 6 | |
| Hc: 2,310 Oe (185 kA/m) | |
| $\sigma_s$: 137 A·m$^2$/kg | |
| Vinyl chloride copolymer | 12 parts |
| MR110 (manufactured by Nippon Zeon Co., Ltd.) | |
| Polyurethane resin | 3 parts |
| UR 8200 (manufactured by Toyobo Co., Ltd.) | |
| α-Alumina | 2 parts |
| HIT55 (manufactured by Sumitomo Chemical Co., Ltd.) | |
| Carbon black | 1 part |
| #55 (manufactured by Asahi Carbon Co., Ltd.) | |
| Butyl stearate | 1 part |
| Stearic acid | 5 parts |
| Methyl ethyl ketone | 100 parts |
| Cyclohexanone | 20 parts |
| Toluene | 60 parts |
| Nonmagnetic Coating Solution: | |
| Nonmagnetic powder, TiO$_2$, | 80 parts |
| crystal system rutile | |
| Average particle size: 0.035 μm | |
| Specific surface area (S$_{BET}$): 40 m$^2$/g | |
| pH: 7 | |
| TiO$_2$ content: 90% or more | |
| DBP oil absorption amount: 27 to 38 ml/100 g | |
| Surface-covering compound: Al$_2$O$_3$, | |
| 8 mass % based on total particles | |
| Carbon black | 20 parts |
| CONDUCTEX SC-U (manufactured by Columbia Carbon Co., Ltd.) | |
| Vinyl chloride copolymer | 12 parts |
| MR110 (manufactured by Nippon Zeon Co., Ltd.) | |

-continued

| Preparation of Coating Solution | |
|---|---|
| Polyurethane resin UR 8200 (manufactured by Toyobo Co., Ltd.) | 5 parts |
| Phenylphosphonic acid | 4 parts |
| Butyl stearate | 1 part |
| Stearic acid | 3 parts |
| Methyl ethyl ketone/cyclohexanone (8/2 mixed solvent) | 250 parts |

With each of the above compositions of the magnetic layer coating solution and the nonmagnetic layer coating solution, components were blended in a kneader, and then dispersed in a sand mill for 4 hours. Polyisocyanate was added to each resulting dispersion solution, in an amount of 2.5 parts to the nonmagnetic layer coating solution, and 3 parts to the magnetic layer coating solution. Further, 40 parts of cyclohexanone was added to each solution. Each solution was filtered through a filter having an average pore diameter of 1 µm to obtain coating solutions for forming a nonmagnetic layer and a magnetic layer. The thus-obtained coating solutions were simultaneously multilayer-coated on an aramid support (trade name: Mictron) having a thickness of 4.4 µm and a central plane average surface roughness of 7.0 nm. The nonmagnetic layer coating solution was coated in a dry thickness of 1.7 µm, and immediately thereafter the magnetic layer coating solution was coated on the nonmagnetic layer in a dry thickness of 0.15 µm. The coated layers were subjected to orientation with a cobalt magnet having a magnetic force of 0.6 T and a solenoid having a magnetic force of 0.6 T while both layers were still wet. After drying, the coated layers were subjected to calendering treatment with a calender of seven stages comprising metal rolls alone at 85° C. and a velocity of 200 m/min. Thereafter, a backng layer (100 parts of a carbon black having an average particle size of 17 nm, 80 parts of calcium carbonate having an average particle size of 40 nm, and 5 parts of alpha-alumina having an average particle size of 200 nm were dispersed in a nitrocellulose resin, a polyurethane resin and a polyisocyanate) having a thickness of 0.5 µm was coated. The obtained web was slit to a width of 3.8 mm. The magnetic layer surface of the thus-produced tape was cleaned with a tape cleaning apparatus having a delivery and a winding-up movement of a slit product to which a nonwoven fabric and a razor blade were attached so as to be pressed against the magnetic surface of the tape, thus a tape sample was obtained.

Comparative Example I-2

A tape sample was prepared in the same manner as in Comparative Example I-1 except that smooth coating layer-forming coating solution P1 (shown in Table I-1 below) was coated on one side of the aramid support in a thickness of 0.05 µm, and after being dried, a nonmagnetic layer and a magnetic layer were coated on the smooth coating layer formed.

Examples I-1 to I-6 and Comparative Examples I-3 to I-6

Each tape sample was prepared in the same manner as in Comparative Example I-2 except that the kind and thickness of the smooth coating layer-forming coating solution shown in Table I-1 was changed as shown in Table I-2 below.

Example I-7

A tape sample was prepared in the same manner as in Example I-3 except that a smooth coating layer was formed by replacing the smooth coating layer-forming coating solution with P7 (shown in Table I-1) and the thus-formed smooth coating layer was irradiated with electron beam of a dose of 5 Mrad.

Example I-8

A tape sample was prepared in the same manner as in Example I-3 except that a smooth coating layer was formed by replacing the smooth coating layer-forming coating solution with P8 (shown in Table I-1) and the thus-formed smooth coating layer was irradiated with ultraviolet ray of a dose of 50 mJ/cm$^2$.

TABLE I-1

Coating Solution for Forming Smooth Coating Layer

| Kind | Material | Solvent | Concentration (mass %) | Viscosity (cp) | Surface Tension (mN/m) |
|---|---|---|---|---|---|
| P1 | A | Methanol | 5 | 3 | 22.0 |
| P2 | A | Methanol | 10 | 25 | 23.5 |
| P3 | A | Methanol | 12 | 60 | 23.0 |
| P4 | A | Ethanol | 5 | 4 | 22.0 |
| P5 | A | 2-Propanol | 5 | 5 | 21.0 |
| P6 | B | MEK | 7 | 5 | 24.5 |
| P7 | C | MEK | 20 | 1 | 24.0 |
| P8 | D | MEK | 20 | 1 | 24.0 |

The materials shown in Table I-1 are as follows.
Material A: Water-soluble polyamide resin ("Water-Soluble Nylon A-90", number average molecular weight: 66,000, manufactured by Toray Industries Inc.)
Material B: Copolymer polyester resin ("Stafix", manufactured by Fuji Photo Film Co., Ltd.)
Material C: Diacrylate of ethylene oxide-modified bisphenol A ("BP-4EA", manufactured by Kyoei-Sha Kagaku Co., Ltd.)
Material D: A mixture of 95 mass parts of Material B and 5 mass parts of benzyl dimethyl ketal ("Irgacure ® 651", manufactured by Ciba Speciality)

Comparative Example I-7

A tape sample was prepared in the same manner as in Comparative Example I-1 except that the magnetic coating solution was replaced with the following composition. The nonmagnetic coating solution was the same as the coating solution used in Comparative Example I-1.

Magnetic Coating Solution:

| | |
|---|---|
| Barium ferrite magnetic powder Composition: Ba/Zn/Co/Nb = 1/1.0/0.5/0.4 (molar ratio) | 100 parts |
| Vinyl chloride copolymer MR-555 (manufactured by Nippon Zeon Co., Ltd.) | 6 parts |
| Polyurethane resin UR 8200 (manufactured by Toyobo Co., Ltd.) | 3 parts |
| α-Alumina HIT55 (manufactured by Sumitomo Chemical Co., Ltd.) | 2 parts |
| Carbon black #55 (manufactured by Asahi Carbon Co., Ltd.) | 5 parts |
| Butyl stearate | 1 part |
| Stearic acid | 2 parts |
| Methyl ethyl ketone | 125 parts |
| Cyclohexanone | 125 parts |

Comparative Example I-8

A tape sample was prepared in the same manner as in Comparative Example I-7 except that smooth coating layer-forming coating solution P1 (shown in Table I-1) was coated on one side of the aramid support in a thickness of 0.05 μm, and after being dried, a nonmagnetic layer and a magnetic layer were coated on the smooth coating layer formed.

Examples I-9 to I-12 and Comparative Examples I-9 to I-12

Each tape sample was prepared in the same manner as in Comparative Example I-8 except that the kind and thickness of the smooth coating layer-forming coating solution shown in Table I-1 was changed as shown in Table I-3 below.

Example I-15

A tape sample was prepared in the same manner as in Example I-11 except that a smooth coating layer was formed by replacing the smooth coating layer-forming coating solution with P7 (shown in Table I-1) and the thus-formed smooth coating layer was irradiated with electron beam of a dose of 5 Mrad.

Example I-16

A tape sample was prepared in the same manner as in Example I-11 except that a smooth coating layer was formed by replacing the smooth coating layer-forming coating solution with P8 (shown in Table I-1) and the thus-formed smooth coating layer was irradiated with ultraviolet ray of a dose of 50 mJ/cm$^2$.

Comparative Example I-13

A tape sample was prepared in the same manner as in Comparative Example I-1 except that a nonmagnetic layer was not provided.

Example I-17

A tape sample was prepared in the same manner as in Example I-2 except that a nonmagnetic layer was not provided.

Comparative Example I-14

A tape sample was prepared in the same manner as in Comparative Example I-1 except that a nonmagnetic layer and a magnetic layer were provided by wet-on-dry (W/D) coating.

Example I-18

A tape sample was prepared in the same manner as in Example I-2 except that a nonmagnetic layer and a magnetic layer were provided by wet-on-dry (W/D) coating.

Comparative Example I-15

| Formation of Magnetic Disc | |
|---|---|
| Magnetic Coating Solution: | |
| Barium ferrite magnetic powder<br>Composition: Ba/Zn/Co/Nb = 1/0.7/0.1/0.3<br>(molar ratio) | 100 parts |
| Vinyl chloride copolymer<br>MR-555 (manufactured by Nippon Zeon Co., Ltd.) | 5 parts |
| Polyurethane resin<br>UR 8200 (manufactured by Toyobo Co., Ltd.) | 3 parts |
| α-Alumina<br>HIT55 (manufactured by Sumitomo Chemical Co., Ltd.) | 10 parts |
| Carbon black<br>#55 (manufactured by Asahi Carbon Co., Ltd.) | 1 part |
| Phenylphosphonic acid | 2 parts |
| Butyl stearate | 10 parts |
| Butoxyethyl stearate | 5 parts |
| Isohexadecyl stearate | 3 parts |
| Stearic acid | 2 parts |
| Methyl ethyl ketone | 125 parts |
| Cyclohexanone | 125 parts |
| Nonmagnetic Coating Solution: | |
| Nonmagnetic powder, TiO$_2$,<br>crystal system rutile<br>Average particle size: 0.035 μm<br>Specific surface area (S$_{BET}$): 40 m$^2$/g<br>pH: 7<br>TiO$_2$ content: 90% or more<br>DBP oil absorption: 27 to 38 ml/100 g<br>Surface-covering compound: Al$_2$O$_3$,<br>8 mass % based on total particles | 80 parts |
| Carbon black<br>CONDUCTEX SC-U (manufactured by Columbia Carbon Co., Ltd.) | 20 parts |
| Vinyl chloride copolymer<br>MR110 (manufactured by Nippon Zeon Co., Ltd.) | 12 parts |
| Polyurethane resin<br>UR 8200 (manufactured by Toyobo Co., Ltd.) | 5 parts |
| Phenylphosphonic acid | 4 parts |
| Butyl stearate | 10 parts |
| Butoxyethyl stearate | 5 parts |
| Isohexadecyl stearate | 2 parts |
| Stearic acid | 3 parts |
| Methyl ethyl ketone/cyclohexanone<br>(8/2 mixed solvent) | 250 parts |

With each of the above compositions of the magnetic layer coating solution and the nonmagnetic layer coating solution, components were blended in a kneader, and then dispersed in a sand mill for 4 hours. Polyisocyanate was added to each resulting dispersion solution, in an amount of 10 parts to the nonmagnetic layer coating solution, and 10 parts to the magnetic layer coating solution. Further, 40 parts of cyclohexanone was added to each solution. Each solution was filtered through a filter having an average pore diameter of 1 μm to obtain coating solutions for forming a nonmagnetic layer and a magnetic layer.

The obtained magnetic layer-forming coating solution was coated on a polyethylene terephthalate support having a thickness of 62 μm and a central plane average surface roughness of 7.0 nm in a dry thickness of 0.2 μm, and the coated layer was subjected to random orientation while the layer was still wet by passing through an alternating current magnetic field generator having two magnetic field intensities of frequency of 50 Hz, magnetic field intensity of 25 mT and frequency of 50 Hz, magnetic field intensity of 12 mT. After drying, the coated layer was subjected to calendering treatment with calenders of 7 stages at 90° C. at linear pressure of 300 kg/cm (294 kN/m). The obtained web was punched to a disc of 3.7 inches, the disc was subjected to a surface treatment by abrasives, thereby a magnetic recording disc was obtained.

Example I-19

A disc sample was prepared in the same manner as in Comparative Example I-15 except that smooth coating layer-forming coating solution P1 (shown in Table I-1) was coated on one side of the support in a thickness of 0.3 µm, and after being dried, a magnetic layer was coated on the smooth coating layer formed without winding.

Comparative Example I-16

The obtained nonmagnetic layer-forming coating solution was coated in a dry thickness of 1.5 µm on a polyethylene terephthalate support having a thickness of 62 µm and a central plane average surface roughness of 7.0 nm, and the magnetic layer-forming coating solution was coated on the obtained nonmagnetic layer in a dry thickness of 0.15 µm, the layers were subjected to random orientation while the magnetic layer was still wet in the same manner as in Comparative Example I-15. The procedure was carried out in the same manner as in Comparative Example I-15 hereafter and a disc sample was obtained.

Example I-20

A disc sample was prepared in the same manner as in Comparative Example I-16 except that the smooth coating layer-forming coating solution was coated on one side of the support, and after being dried, a nonmagnetic layer and a magnetic layer were coated on the smooth coating layer formed without winding as in Example I-19.

Comparative Example I-17

The nonmagnetic layer coating solution and magnetic layer coating solution were simultaneously multilayer-coated on a polyethylene terephthalate support having a thickness of 62 µm and a central plane average surface roughness of 7.0 nm of the surface side on which a magnetic layer was to be coated. The nonmagnetic layer coating solution was coated in a dry thickness of 1.5 µm, immediately thereafter the magnetic layer coating solution was coated on the nonmagnetic layer in a dry thickness of 0.15 µm. The coated layers were subjected to random orientation while both layers were still wet in the same manner as in Comparative Example I-15. The procedure was carried out in the same manner as in Comparative Example I-15 hereafter and a disc sample was obtained.

Example I-21

A disc sample was prepared in the same manner as in Comparative Example I-17 except that the smooth coating layer-forming coating solution was coated on one side of the support, and after being dried, a nonmagnetic layer and a magnetic layer were coated on the smooth coating layer formed without winding as in Example I-19.

Performances of each of the above-prepared computer tapes and magnetic discs were evaluated by the following methods.

Evaluation Method:
(1) C/N ratio (tape): Measurement was performed with a recording head (MIG, gap length: 0.15 µm, 1.8 T) and an MR head for reproduction attached to a drum tester. Head-medium relative speed was from 1 to 3 m/min, and modulated noise was measured. Areal recording density was 0.57 Gbit/inch$^2$ (track pitch: 6.8 µm, pit length: 0.165 µm).

(2) S/N ratio (disc): Measurement was performed by attaching a recording head [MIG (Metal in Gap)] and an MR head for reproduction to a spin stand. Number of revolution was from 2,500 to 3,500 rpm, the radius was 30 mm, and noise was DC noise. Areal recording density was 1 Gbit/inch$^2$ (track pitch: 1 µm, pit length: 0.03 µm).

(3) PN of smooth coating layer (20 nm or more): Protrusions in 30 µm square (900 µm$^2$) were measured by using a nano-scope 3 [AFM (interatomic force microscope)] (a product of Digital Instruments Co.) and an SiN probe of a quadrangular pyramid having an arris angle of 70°.

(4) Elution (amount) of smooth coating layer: The elution (amount) of the smooth coating layer in a mixed solution of methyl ethyl ketone (MEK)/cyclohexanone (1/1) was obtained.

The results of evaluation of magnetic tapes are shown in Tables I-2 to I-4, and the results of evaluation of magnetic discs are shown in Table I-5 respectively.

TABLE I-2

Tape (metal system, simultaneous multilayer coating)

| | Smooth Coating Layer | | | | | |
|---|---|---|---|---|---|---|
| Sample No. | Kind of Coating Solution | Thickness (µm) | Eluted Amount (mg/cm$^2$) | Ra (nm) | PN (20 nm or more) (number/ 900 µm$^2$) | C/N Ratio (dB) |
| Comparative Example I-1 | None | — | — | 7.0 | 42 | −5.4 |
| Comparative Example I-2 | P1 | 0.05 | 0.0 | 6.3 | 31 | −3.4 |
| Example I-1 | P1 | 0.1 | 0.0 | 4.5 | 18 | 0.0 |
| Example I-2 | P1 | 0.3 | 0.0 | 2.1 | 10 | 1.5 |
| Example I-3 | P1 | 0.5 | 0.11 | 1.8 | 6 | 2.2 |
| Example I-4 | P1 | 1.0 | 0.14 | 1.6 | 3 | 3.4 |
| Comparative Example I-3 | P1 | 1.5 | 0.19 | 5.8 | 1 | −2.7 |
| Example I-5 | P2 | 0.5 | 0.10 | 2.3 | 8 | 2.4 |
| Comparative Example I-4 | P3 | 0.5 | 0.12 | 6.2 | 27 | −1.2 |
| Example I-6 | P4 | 0.5 | 0.11 | 3.3 | 11 | 1.3 |
| Comparative Example I-5 | P5 | 0.5 | 0.10 | 6.5 | 26 | −3.1 |
| Comparative Example I-6 | P6 | 0.5 | 0.50 | 7.3 | 13 | −5.2 |
| Example I-7 | P7 | 0.5 | 0.0 | 1.4 | 3 | 4.0 |
| Example I-8 | P8 | 0.5 | 0.0 | 1.6 | 5 | 3.8 |

TABLE I-3

Tape (BaFe system, simultaneous multilayer coating)

| | Smooth Coating Layer | | | | | |
|---|---|---|---|---|---|---|
| Sample No. | Kind of Coating Solution | Thickness (µm) | Eluted Amount (mg/cm$^2$) | Ra (nm) | PN (20 nm or more) (number/ 900 µm$^2$) | C/N Ratio (dB) |
| Comparative Example I-7 | None | — | — | 7.0 | 42 | −4.2 |
| Comparative Example I-8 | P1 | 0.05 | 0.0 | 6.3 | 31 | −2.8 |
| Example I-9 | P1 | 0.1 | 0.0 | 4.5 | 18 | 2.0 |
| Example I-10 | P1 | 0.3 | 0.0 | 2.1 | 10 | 3.1 |
| Example I-11 | P1 | 0.5 | 0.11 | 1.8 | 6 | 4.6 |
| Example I-12 | P1 | 1.0 | 0.14 | 1.6 | 3 | 5.4 |

TABLE I-3-continued

Tape (BaFe system, simultaneous multilayer coating)

Smooth Coating Layer

| Sample No. | Kind of Coating Solution | Eluted Thickness (μm) | Amount (mg/cm²) | Ra (nm) | PN (20 nm or more) (number/ 900 μm²) | C/N Ratio (dB) |
|---|---|---|---|---|---|---|
| Comparative Example I-9 | P1 | 1.5 | 0.19 | 5.8 | 1 | −0.5 |
| Example I-13 | P2 | 0.5 | 0.10 | 2.3 | 8 | 4.3 |
| Comparative Example I-10 | P3 | 0.5 | 0.12 | 6.2 | 27 | 1.0 |
| Example I-14 | P4 | 0.5 | 0.11 | 3.3 | 11 | 3.4 |
| Comparative Example I-11 | P5 | 0.5 | 0.10 | 6.5 | 26 | −1.1 |
| Comparative Example I-12 | P6 | 0.5 | 0.5 | 7.3 | 13 | −3.6 |
| Example I-15 | P7 | 0.5 | 0.0 | 1.4 | 3 | 5.7 |
| Example I-16 | P8 | 0.5 | 0.0 | 1.6 | 5 | 5.1 |

TABLE I-4

Tape (monolayer, W/D coating)

Smooth Coating Layer

| Sample No. | Kind of Coating Solution | Thickness (μm) | Eluted Amount (mg/cm²) | Ra (nm) | PN (20 nm or more) (number/ 900 μm²) | C/N Ratio (dB) | Remarks |
|---|---|---|---|---|---|---|---|
| Comparative Example I-13 | None | — | — | 7.0 | 42 | −6.2 | Monolayer |
| Example I-17 | P1 | 0.3 | 0.0 | 2.1 | 10 | 2.0 | Monolayer |
| Comparative Example I-14 | None | — | — | 7.0 | 42 | −4.4 | W/D |
| Example I-18 | P1 | 0.3 | 0.0 | 2.1 | 10 | 3.1 | W/D |

TABLE I-5

Disc

Smooth Coating Layer

| Sample No. | Kind of Coating Solution | Thickness (μm) | Eluted Amount (mg/cm²) | Ra (nm) | PN (20 nm or more) (number/ 900 μm²) | C/N Ratio (dB) | Remarks |
|---|---|---|---|---|---|---|---|
| Comparative Example I-15 | None | — | — | 7.0 | 42 | −5.3 | Monolayer |
| Example I-19 | P1 | 0.3 | 0.0 | 2.0 | 11 | 2.1 | Monolayer |
| Comparative Example I-16 | None | — | — | 7.0 | 65 | −4.8 | W/D |
| Example I-20 | P1 | 0.3 | 0.0 | 2.4 | 9 | 3.2 | W/D |
| Comparative Example I-17 | None | — | — | 7.0 | 60 | −4.2 | W/W |
| Example I-21 | P1 | 0.3 | 0.0 | 2.1 | 6 | 3.6 | W/W |

From the results shown in Table I-2 to I-5, it can be seen that the comparative samples which do not satisfy the necessary conditions of the smooth coating layer are inferior to the samples in the present invention in C/N ratio or S/N ratio.

The present invention can provide a high density magnetic recording medium which is improved in the surface property of a magnetic layer, as a result, improved in C/N ratio or S/N ratio inexpensively by forming a smooth coating layer on the support of a magnetic recording medium.

Comparative Example II-1

Formation of Magnetic Tape

Preparation of Coating Solution

Magnetic Layer Coating Solution and Nonmagnetic Layer Coating Solution:

A magnetic layer coating solution and a nonmagnetic layer coating solution were prepared in the same manner as in Comparative Example I-1, and a tape sample was prepared in the same manner as in Comparative Example I-1.

Comparative Example II-2

A tape sample was prepared in the same manner as in Comparative Example II-1 except that smooth coating layer-forming coating solution P1 (shown in Table II-1 below) was coated on one side of the aramid support in a thickness of 0.05 μm, and after being dried, a nonmagnetic layer and a magnetic layer were coated on the smooth coating layer without winding.

Examples II-1 to II-3 and Comparative Example II-3

Each tape sample was prepared in the same manner as in Comparative Example II-2 except that the thickness of the smooth coating layer was changed to the thickness shown in Table II-2 below.

Comparative Example II-4

A tape sample was prepared in the same manner as in Example II-2 except that upper and lower layers were coated on the smooth coating layer once rolled up in a roll after being formed and delivered again.

Example II-4

A tape sample was prepared in the same manner as in Example II-2 except that a smooth coating layer was formed by replacing the smooth coating layer-forming coating solution with P2 (shown in Table II-1) and the thus-formed smooth coating layer was irradiated with electron beam of a dose of 5 Mrad.

Comparative Example II-5

A tape sample was prepared in the same manner as in Example II-4 except that upper and lower layers were coated on the smooth coating layer once rolled up in a roll after being formed and delivered again.

Example II-5

A tape sample was prepared in the same manner as in Example II-2 except that a smooth coating layer was formed by replacing the smooth coating layer-forming coating solution with P3 (shown in Table II-1) and the thus-formed smooth coating layer was irradiated with ultraviolet ray of a dose of 50 mJ/cm$^2$.

Comparative Example II-6

A tape sample was prepared in the same manner as in Example II-5 except that upper and lower layers were coated on the smooth coating layer once rolled up in a roll after being formed and delivered again.

TABLE II-1

Coating Solution for Forming Smooth Coating Layer

| Kind | Material | Solvent | Concentration (mass %) | Viscosity (cp) | Surface Tension (mN/m) |
|------|----------|---------|------------------------|----------------|------------------------|
| P1   | A        | Methanol| 5                      | 3              | 22.0                   |
| P2   | B        | MEK     | 20                     | 1              | 24.0                   |
| P3   | C        | MEK     | 20                     | 1              | 24.0                   |

The materials shown in Table II-1 are as follows.
Material A: Water-soluble polyamide resin ("Water-Soluble Nylon A-90", number average molecular weight: 66,000, manufactured by Toray Industries Inc.)
Material B: Diacrylate of ethylene oxide-modified bisphenol A ("BP-4EA", manufactured by Kyoei-Sha Kagaku Co., Ltd.)
Material C: A mixture of 95 mass parts of Material B and 5 mass parts of benzyl dimethyl ketal ("Irgacure® 651", manufactured by Ciba Speciality)

Comparative Example II-7

A tape sample was prepared in the same manner as in Comparative Example II-1 except that the magnetic coating solution was replaced with the following composition. The nonmagnetic coating solution was the same as the coating solution used in Comparative Example II-1.

Magnetic Coating Solution:

| | |
|---|---|
| Barium ferrite magnetic powder | 100 parts |
| Composition: Ba/Zn/Co/Nb = 1/1.0/0.5/0.4 (molar ratio) | |
| Vinyl chloride copolymer MR-555 (manufactured by Nippon Zeon Co., Ltd.) | 6 parts |
| Polyurethane resin UR 8200 (manufactured by Toyobo Co., Ltd.) | 3 parts |
| α-Alumina HIT55 (manufactured by Sumitomo Chemical Co., Ltd.) | 2 parts |
| Carbon black #55 (manufactured by Asahi Carbon Co., Ltd.) | 5 parts |
| Butyl stearate | 1 part |
| Stearic acid | 2 parts |
| Methyl ethyl ketone | 125 parts |
| Cyclohexanone | 125 parts |

Comparative Example II-8

A tape sample was prepared in the same manner as in Comparative Example II-7 except that smooth coating layer-forming coating solution P1 (shown in Table II-1) was coated on one side of the aramid support in a thickness of 0.05 μm, and after being dried, an on magnetic layer and a magnetic layer were coated on the smooth coating layer formed without winding.

Examples II-7 to II-9 and Comparative Example II-9

Each tape sample was prepared in the same manner as in Comparative Example II-8 except that the thickness of the smooth coating layer-forming coating solution was changed as shown in Table II-2 below.

Comparative Example II-10

A tape sample was prepared in the same manner as in Example II-8 except that upper and lower layers were coated on the smooth coating layer once rolled up in a roll after being formed and delivered again.

Example II-10

A tape sample was prepared in the same manner as in Example II-8 except that a smooth coating layer was formed by replacing the smooth coating layer-forming coating solution with P2 (shown in Table II-1) and the thus-formed smooth coating layer was irradiated with electron beam of a dose of 5 Mrad.

Comparative Example II-11

A tape sample was prepared in the same manner as in Example II-10 except that upper and lower layers were coated on the smooth coating layer once rolled up in a roll after being formed and delivered again.

Example II-11

A tape sample was prepared in the same manner as in Example II-8 except that a smooth coating layer was formed by replacing the smooth coating layer-forming coating solution with P3 (shown in Table II-1) and the thus-formed smooth coating layer was irradiated with ultraviolet ray of a dose of 50 mJ/cm$^2$.

Comparative Example II-12

A tape sample was prepared in the same manner as in Example II-11 except that upper and lower layers were coated on the smooth coating layer once rolled up in a roll after being formed and delivered again.

Comparative Example II-13

A tape sample was prepared in the same manner as in Comparative Example II-1 except that a nonmagnetic layer was not provided.

Example II-13

A tape sample was prepared in the same manner as in Example II-2 except that a nonmagnetic layer was not provided.

Comparative Example II-14

A tape sample was prepared in the same manner as in Comparative Example II-1 except that a nonmagnetic layer and a magnetic layer were provided by wet-on-dry (W/D) coating.

Example II-14

A tape sample was prepared in the same manner as in Example II-2 except that a nonmagnetic layer and a magnetic layer were provided by wet-on-dry (W/D) coating.

Comparative Example II-15

Formation of Magnetic Disc

A magnetic layer coating solution and a nonmagnetic layer coating solution were prepared in the same manner as in Comparative Example I-15, and a disc sample was prepared in the same manner as in Comparative Example I-15.

The obtained magnetic layer-forming coating solution was coated on a polyethylene terephthalate support having a thickness of 62 µm and a central plane average surface roughness of 7.0 nm in a dry thickness of 0.2 µm, and the coated layer was subjected to random orientation while the layer was still wet by passing through an alternating current magnetic field generator having two magnetic field intensities of frequency of 50 Hz, magnetic field intensity of 25 mT and frequency of 50 Hz, magnetic field intensity of 12 mT. After drying, the coated layer was subjected to calendering treatment with calenders of 7 stages at 90° C. at linear pressure of 300 kg/cm (294 kN/m). The obtained web was punched to a disc of 3.7 inches, the disc was subjected to a surface treatment by abrasives, thereby a magnetic recording disc was obtained.

Example II-15

A disc sample was prepared in the same manner as in Comparative Example II-15 except that smooth coating layer-forming coating solution P1 (shown in Table II-1) was coated on one side of the support in a thickness of 0.3 µm, and after being dried, a magnetic layer was coated on the smooth coating layer formed without winding.

Comparative Example I-16

The obtained nonmagnetic layer-forming coating solution was coated in a dry thickness of 1.5 µm on a polyethylene terephthalate support having a thickness of 62 µm and a central plane average surface roughness of 7.0 nm, and the magnetic layer-forming coating solution was coated on the obtained nonmagnetic layer in a dry thickness of 0.15 µm, the layers were subjected to random orientation while the magnetic layer was still wet in the same manner as in Comparative Example II-15. The procedure was carried out in the same manner as in Comparative Example II-15 hereafter and a disc sample was obtained.

Example II-16

A disc sample was prepared in the same manner as in Comparative Example II-16 except that the smooth coating layer-forming coating solution was coated on one side of the support, and after being dried, a nonmagnetic layer and a magnetic layer were coated on the smooth coating layer formed without winding as in Example II-15.

Comparative Example II-17

The nonmagnetic layer coating solution and magnetic layer coating solution were simultaneously multilayer-coated on a polyethylene terephthalate support having a thickness of 62 µm and a central plane average surface roughness of 7.0 nm of the surface side on which a magnetic layer was to be coated. The nonmagnetic layer coating solution was coated in a dry thickness of 1.5 µm, immediately thereafter the magnetic layer coating solution was coated on the nonmagnetic layer in a dry thickness of 0.15 µm. The coated layers were subjected to random orientation while both layers were still wet in the same manner as in Comparative Example II-15. The procedure was carried out in the same manner as in Comparative Example II-15 hereafter and a disc sample was obtained.

Example II-17

A disc sample was prepared in the same manner as in Comparative Example II-17 except that the smooth coating layer-forming coating solution was coated on one side of the support, and after being dried, a nonmagnetic layer and a magnetic layer were coated on the smooth coating layer formed without winding as in Example II-15.

Performances of each of the above-prepared computer tapes and magnetic discs were evaluated by the following methods.

Evaluation Method:
(1) C/N ratio (tape): Measurement was performed in the same manner as above.
(2) S/N ratio (disc): Measurement was performed in the same manner as above.
(3) PN of smooth coating layer (20 nm or more): Measurement was performed in the same manner as above.
(4) Elution of smooth coating layer: Measurement was performed in the same manner as above.

The results of evaluation of magnetic tapes are shown in Tables II-2 to II-4, and the results of evaluation of magnetic discs are shown in Table II-5 respectively.

TABLE II-2

Tape (metal system, simultaneous multilayer coating)

| Sample No. | Smooth Coating Layer | | | | | Winding after Formation of Smooth Coating Layer | State of Support | C/N Ratio (dB) |
|---|---|---|---|---|---|---|---|---|
| | Kind of Coating Solution | Thickness (μm) | Eluted Amount (mg/cm²) | Ra (nm) | PN (20 nm or more) (number/ 900 μm²) | | | |
| Comparative Example II-1 | None | — | — | 7.0 | 42 | No | Free of wrinkles | −5.4 |
| Comparative Example II-2 | P1 | 0.05 | 0.0 | 6.3 | 31 | No | Free of wrinkles | −3.4 |
| Example II-1 | P1 | 0.1 | 0.0 | 4.5 | 18 | No | Free of wrinkles | 0.0 |
| Example II-2 | P1 | 0.5 | 0.11 | 1.8 | 6 | No | Free of wrinkles | 2.2 |
| Example II-3 | P1 | 1.0 | 0.14 | 1.6 | 3 | No | Free of wrinkles | 3.4 |
| Comparative Example II-3 | P1 | 1.5 | 0.19 | 5.8 | 1 | No | Free of wrinkles | −2.7 |
| Comparative Example II-4 | P1 | 0.5 | 0.11 | 1.8 | 6 | Yes | Wrinkled | Measurement was impossible |
| Example II-4 | P2 | 0.5 | 0.0 | 1.4 | 3 | No | Free of wrinkles | 4.0 |
| Comparative Example II-5 | P2 | 0.5 | 0.0 | 1.4 | 3 | Yes | Wrinkled | Measurement was impossible |
| Example II-5 | P3 | 0.5 | 0.0 | 1.6 | 5 | No | Free of wrinkles | 3.8 |
| Comparative Example II-6 | P3 | 0.5 | 0.0 | 1.6 | 5 | Yes | Wrinkled | Measurement was impossible |

TABLE II-3

Tape (BaFe system, simultaneous multilayer coating)

| Sample No. | Smooth Coating Layer | | | | | Winding after Formation of Smooth Coating Layer | State of Support | C/N Ratio (dB) |
|---|---|---|---|---|---|---|---|---|
| | Kind of Coating Solution | Thickness (μm) | Eluted Amount (mg/cm²) | Ra (nm) | PN (20 nm or more) (number/ 900 μm²) | | | |
| Comparative Example II-7 | None | — | — | 7.0 | 42 | No | Free of wrinkles | −4.2 |
| Comparative Example II-8 | P1 | 0.05 | 0.0 | 6.3 | 31 | No | Free of wrinkles | −2.8 |
| Example II-7 | P1 | 0.1 | 0.0 | 4.5 | 18 | No | Free of wrinkles | 2.0 |
| Example II-8 | P1 | 0.5 | 0.11 | 1.8 | 6 | No | Free of wrinkles | 4.6 |
| Example II-9 | P1 | 1.0 | 0.14 | 1.6 | 3 | No | Free of wrinkles | 5.4 |
| Comparative Example II-9 | P1 | 1.5 | 0.19 | 5.8 | 1 | No | Free of wrinkles | −0.5 |
| Comparative Example II-10 | P1 | 0.5 | 0.11 | 1.8 | 6 | Yes | Wrinkled | Measurement was impossible |
| Example II-10 | P2 | 0.5 | 0.0 | 1.4 | 3 | No | Free of wrinkles | 5.8 |
| Comparative Example II-11 | P2 | 0.5 | 0.0 | 1.4 | 3 | Yes | Wrinkled | Measurement was impossible |
| Example II-11 | P3 | 0.5 | 0.0 | 1.6 | 5 | No | Free of wrinkles | 5.2 |
| Comparative Example II-12 | P3 | 0.5 | 0.0 | 1.6 | 5 | Yes | Wrinkled | Measurement was impossible |

TABLE II-4

Tape (monolayer, W/D coating)

| | Smooth Coating Layer | | | | | |
|---|---|---|---|---|---|---|
| Sample No. | Kind of Coating Solution | Thickness (μm) | Eluted Amount (mg/cm$^2$) | Ra (nm) | PN (20 nm or more) (number/ 900 μm$^2$) | C/N Ratio (dB) | Remarks |
| Comparative Example II-13 | None | — | — | 7.0 | 42 | −6.2 | Monolayer |
| Example II-13 | P1 | 0.3 | 0.0 | 2.1 | 10 | 2.0 | Monolayer |
| Comparative Example II-14 | None | — | — | 7.0 | 42 | −4.4 | W/D |
| Example II-14 | P1 | 0.3 | 0.0 | 2.1 | 10 | 3.1 | W/D |

TABLE II-5

Disc

| | Smooth Coating Layer | | | | | |
|---|---|---|---|---|---|---|
| Sample No. | Kind of Coating Solution | Thickness (μm) | Eluted Amount (mg/cm$^2$) | Ra (nm) | PN (20 nm or more) (number/ 900 μm$^2$) | C/N Ratio (dB) | Remarks |
| Comparative Example II-15 | None | — | — | 7.0 | 72 | −5.3 | Monolayer |
| Example II-15 | P1 | 0.3 | 0.0 | 2.0 | 11 | 2.1 | Monolayer |
| Comparative Example II-16 | None | — | — | 7.0 | 65 | −4.8 | W/D |
| Example II-16 | P1 | 0.3 | 0.0 | 2.4 | 9 | 3.2 | W/D |
| Comparative Example II-17 | None | — | — | 7.0 | 60 | −4.2 | W/W |
| Example II-17 | P1 | 0.3 | 0.0 | 2.1 | 6 | 3.6 | W/W |

From the results shown in Table II-2 to II-5, it can be seen that the comparative samples which do not satisfy the necessary conditions of the smooth coating layer or the manufacturing conditions of the magnetic recording medium are inferior to the samples in the present invention in C/N ratio or S/N ratio.

The present invention can provide a high density magnetic recording medium which is improved in the surface property of a magnetic layer, as a result, improved in C/N ratio or S/N ratio inexpensively by forming a smooth coating layer on the support of a magnetic recording medium and forming a magnetic layer on the smooth coating layer without winding the smooth coating layer.

The entitle disclosure of each and every foreign patent application from which the benefit of foreign priority has been claimed in the present application is incorporated herein by reference, as if fully set forth herein.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising a support having provided on the surface of at least one side thereon a smooth coating layer, a non-magnetic layer, and a magnetic layer, wherein the smooth coating layer is provided directly on the surface of the support and the non-magnetic layer is between the magnetic layer and the smooth coating layer, wherein the smooth coating layer has a thickness of from 0.10 to 0.70 μm, a central plane average surface roughness (Ra) of 5 nm or less, and 20 or less per 900 μm$^2$ of protrusions having a height of 20 nm or more measured by an interatomic force microscope (AFM), wherein the central plane average surface roughness of the support is larger than the central plane average surface roughness of the smooth coating layer, wherein an elution (amount) of the smooth coating layer in a mixed solution of methyl ethyl ketone (MEK)/cyclohexanone (1/1) is from 0.0 to 0.4 mg/cm$^2$, wherein the non-magnetic layer contains a non-magnetic powder and a binder and has a thickness of from 0.5 to 3.0 μm, wherein the smooth coating layer comprises a coating solution containing a compound having a radiation-curable functional group, and wherein the smooth coating layer is produced by irradiating the radiation-curable functional group of the smooth coating layer.

2. The magnetic recording medium as in claim 1, wherein the smooth coating layer comprises a high polymer having a number average molecular weight of from 10,000 to 100,000.

3. The magnetic recording medium as in claim 1, wherein the magnetic layer comprises a ferromagnetic powder and a binder as main components and has a thickness of from 20 to 500 nm.

4. The magnetic recording medium as in claim 1, wherein the non-magnetic layer and the magnetic layer are provided by wet-on-wet coating.

5. The magnetic recording medium as in claim 1, wherein the non-magnetic powder contained in the non-magnetic layer is metallic oxide.

6. The magnetic recording medium as in claim 1, wherein the non-magnetic powder contained in the non-magnetic layer is acicular metallic oxide having a particle size of 0.01 to 0.2 μm.

7. The magnetic recording medium as in claim 1, wherein the non-magnetic powder contained in the non-magnetic layer is acicular titanium dioxide having a particle size of 0.01 to 0.2 μm or acicular alpha-iron oxide having a particle size of 0.01 to 0.2 μm.

* * * * *